US012260707B2

(12) United States Patent
Honeycutt et al.

(10) Patent No.: US 12,260,707 B2
(45) Date of Patent: Mar. 25, 2025

(54) ELECTRONIC GAMING SYSTEMS AND METHODS WITH PERSISTENT GAME TIERS

(71) Applicant: Aristocrat Technologies, Inc., Las Vegas, NV (US)

(72) Inventors: Robert Honeycutt, Henderson, NV (US); Adam Bland, Henderson, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 356 days.

(21) Appl. No.: 17/957,859

(22) Filed: Sep. 30, 2022

(65) Prior Publication Data

US 2024/0087420 A1 Mar. 14, 2024

Related U.S. Application Data

(60) Provisional application No. 63/375,506, filed on Sep. 13, 2022.

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/3258* (2013.01); *G07F 17/34* (2013.01)

(58) Field of Classification Search
CPC ............. G06F 17/3267; G06F 17/3213; G06F 17/3258; G06F 17/34
USPC ........................................................... 463/20
See application file for complete search history.

(56) References Cited

U.S. PATENT DOCUMENTS

| | | | |
|---|---|---|---|
| 9,672,699 B2 | 6/2017 | Leslie | |
| 10,395,469 B2 * | 8/2019 | Casey | G07F 17/3213 |
| 11,270,552 B1 | 3/2022 | Delekta | |
| 2008/0108409 A1 | 5/2008 | Cole | |
| 2009/0312084 A1 | 12/2009 | Inamura | |
| 2018/0204021 A1 * | 7/2018 | Long | G06F 21/60 |
| 2019/0026976 A1 * | 1/2019 | Casey | G07F 17/3258 |
| 2019/0206191 A1 | 7/2019 | Halvorson | |
| 2019/0371119 A1 * | 12/2019 | Casey | G07F 17/3244 |
| 2022/0092918 A1 | 3/2022 | Uberuaga | |
| 2023/0080994 A1 * | 3/2023 | Marsh | G07F 17/3267 463/20 |
| 2023/0081422 A1 * | 3/2023 | Marsh | G07F 17/34 463/20 |

(Continued)

*Primary Examiner* — Pierre E Elisca
(74) *Attorney, Agent, or Firm* — Armstrong Teasdale LLP

(57) ABSTRACT

An electronic gaming device that includes a display device, a memory device, and a game controller including a processor is described. The processor is configured to apply a game tier to a base game, wherein the game tier corresponds to a credit award range, and cause a base game outcome including symbols displayed on reels to be displayed. The processor is also configured to determine that the base game outcome includes a prize symbol including a first credit award within the credit award range of the game tier. The processor is further configured to apply the game tier to a feature game and cause a feature game outcome including symbols displayed on reels to be displayed. The processor is further configured to determine that the feature game outcome includes the prize symbol including a second credit award within the credit award range of the game tier.

20 Claims, 19 Drawing Sheets

(56) References Cited

U.S. PATENT DOCUMENTS

2023/0267808 A1 * 8/2023 Bouvier .............. G07F 17/3244
463/20

* cited by examiner

ELECTRONIC GAMING SYSTEMS AND METHODS WITH PERSISTENT GAME TIERS

CROSS REFERENCE TO RELATED APPLICATIONS

This application claims the benefit of priority to U.S. Provisional Patent Application No. 63/375,506, filed Sep. 13, 2022, the contents and disclosure of which are incorporated by reference herein in their entirety.

TECHNICAL FIELD

The field of disclosure relates generally to electronic gaming, and more specifically, to electronic gaming systems and methods that include electronic games having persistent game tiers.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, an electronic gaming device is described. The electronic gaming device includes a display device, a memory device storing instructions, and a processor in communication with the display device and the memory device. When the instructions are executed by the processor, the processor is configured to determine a game tier of a plurality of game tiers to apply to a base game outcome of a base game, wherein the game tier corresponds to a credit award range, apply the game tier to the base game outcome, and cause the base game outcome to be displayed on the display device, the base game outcome comprising a plurality of symbols included on a plurality of reels displayed in a matrix of symbol positions. The processor is also configured to determine that the base game outcome includes a prize symbol in a first symbol position of the matrix of symbol positions, wherein the prize symbol includes a first credit award within the credit award range corresponding to the game tier and, in response to determining that the base game outcome includes the prize symbol, cause a feature game of additional spins to be initiated. The processor is also configured to apply the game tier to a feature game outcome of the feature game and cause the feature game outcome to be displayed on the display device, the feature game outcome comprising the plurality of symbols included on the plurality of reels displayed in the matrix of symbol positions. The processor is further configured to determine that the feature game outcome includes the prize symbol and an additional prize symbol, wherein the additional prize symbol includes a second credit award within the credit award range corresponding to the game tier and output the second credit award.

In another aspect, a non-transitory computer-readable storage medium with instructions stored thereon is provided. When the instructions are executed by the processor, the processor is configured to determine a game tier of a plurality of game tiers to apply to a base game outcome of a base game, wherein the game tier corresponds to a credit award range, apply the game tier to the base game outcome, and cause the base game outcome to be displayed on the display device, the base game outcome comprising a plurality of symbols included on a plurality of reels displayed in a matrix of symbol positions. The processor is also configured to determine that the base game outcome includes a prize symbol in a first symbol position of the matrix of symbol positions, wherein the prize symbol includes a first credit award within the credit award range corresponding to the game tier and, in response to determining that the base game outcome includes the prize symbol, cause a feature game of additional spins to be initiated. The processor is also configured to apply the game tier to a feature game outcome of the feature game and cause the feature game outcome to be displayed on the display device, the feature game outcome comprising the plurality of symbols included on the plurality of reels displayed in the matrix of symbol positions. The processor is further configured to determine that the feature game outcome includes the prize symbol and an additional prize symbol, wherein the additional prize symbol includes a second credit award within the credit award range corresponding to the game tier and output the second credit award.

In yet another aspect, a method of electronic gaming is provided. The method includes determining a game tier of a plurality of game tiers to apply to a base game outcome of a base game, wherein the game tier corresponds to a credit award range, applying the game tier to the base game outcome, and causing the base game outcome to be displayed on the display device, the base game outcome comprising a plurality of symbols included on a plurality of reels displayed in a matrix of symbol positions. The method also includes determining that the base game outcome includes a prize symbol in a first symbol position of the matrix of symbol positions, wherein the prize symbol includes a first credit award within the credit award range corresponding to the game tier and in response to determining that the base game outcome includes the prize symbol, causing a feature game of additional spins to be initiated. The method also includes applying the game tier to a feature game outcome of the feature game and causing the feature game outcome to be displayed on the display device, the feature game outcome comprising the plurality of symbols included on the plurality of reels displayed in the matrix of symbol positions. The method further includes determining that the feature game outcome includes the prize symbol and an additional prize symbol, wherein the additional prize symbol includes a second credit award within the credit award range corresponding to the game tier and outputting the second credit award.

DETAILED DESCRIPTION

Figure 1:
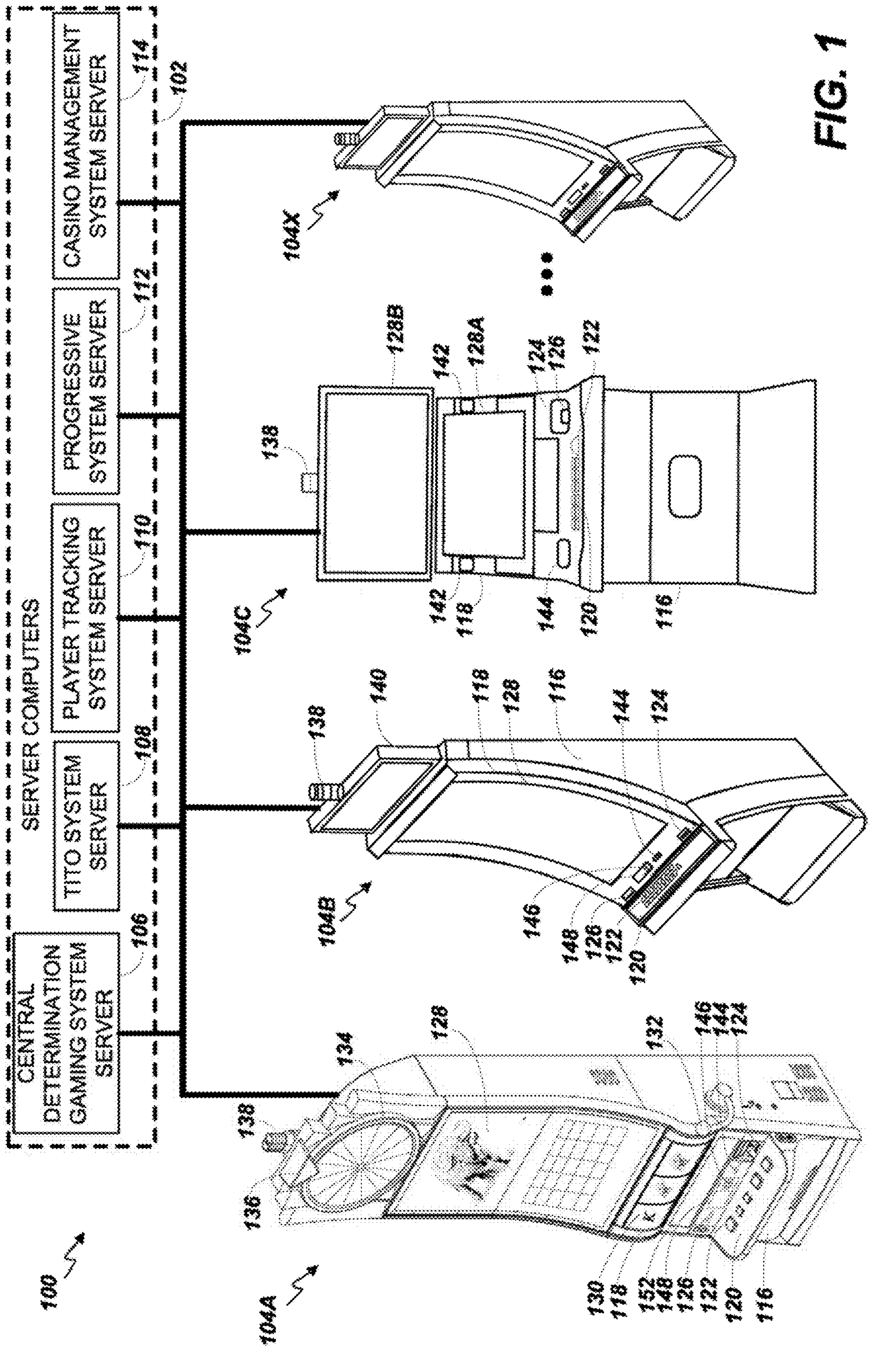
FIG. 1 is an exemplary diagram showing several EGMs networked with various gaming related servers.

The present application is directed to electronic gaming or electronic game play, and more specifically, to computer based electronic gaming or game systems and methods for electronic gaming with game tiers. For example, game tiers may be applied to RNG based games (e.g., Class III slot games), as described elsewhere herein. Specifically, game tiers may persist across base games, feature games, and/or bonus games. In the example embodiment, a base game is provided. A base game outcome of the base game includes symbols displayed on reels on a display device wherein each reel is configured to spin (e.g., mechanically or virtually). The base game outcome may include a prize symbol (e.g., a symbol, otherwise known as a "cash on reel" or a credit symbol, that itself includes display of a credit value and/or respective output amount to be provided). The prize symbol may include a credit award, a jackpot award, and/or a number of free/additional spins.

In the example embodiment, the prize awarded by the prize symbol may correspond to the game tier, in that the credit award, the jackpot award, and/or the number of free/additional spins may depend on (e.g., be increased or decreased based on) the game tier. For example, the credit award may be a multiple of a bet amount, with the multiple depending on the game tier. Additionally, for example, the jackpot associated with the jackpot award may also depend on the game tier. Furthermore, for example, the number of free/additional spins may also depend on the game tier. In the example embodiment, a game tier that corresponds with improved prizes (e.g., an increased credit award, jackpot award, and/or number of free additional spins) may be less likely to be applied. The color of the prize symbol may depend on the game tier, and the color may be associated with the value of the prize awarded. Each game tier may be associated with a range of values and/or a weighted/lookup table. Each spin of the reels in the base game may apply a new game tier prior to displaying new symbols on the reels.

In some embodiments, certain base game outcomes (e.g., display of a certain number of one or more symbols) may trigger one or more feature games of a number of additional spins with a hold and spin mechanic. In the example embodiment, a feature game outcome of the feature game includes symbols displayed on the reels. Each spin of the reels in the feature game applies the game tier applied to the base game prior to displaying new symbols on the reels. For example, the base game outcome may include a prize symbol, which may trigger one or more feature games. In the example embodiment, the prize symbol is persistent, or "sticky," in that it remains in place even after additional spins of the reels in the feature game. Each symbol display position of the symbols in the feature game may be its own individual reel. Accordingly, each of the symbols in the feature game may be spun in their individual boxes/positions.

The feature game outcome may include a prize symbol. In the example embodiment, the game tier persists from the base game to the feature game, in that the prize awarded by the prize symbol is associated with a shared range of values and/or with a shared weighted/lookup table across the base game and the feature game. For additional spins of the feature game, each symbol display position/reel not including the prize symbol may be spun. The feature game may complete/terminate upon a number of remaining additional spins with a hold and spin mechanic being zero. In the example embodiment, the completion/termination of the feature game triggers the base game.

In some embodiments, certain base game and/or feature game outcomes (e.g., display of a certain number of one or more symbols) may trigger one or more bonus games of a number of free spins. In the example embodiment, a bonus game outcome of the bonus game includes symbols displayed on the reels. Each spin of the reels in the bonus game applies the game tier applied in the base game prior to displaying new symbols on the reels. For example, a bonus symbol may be displayed as part of the base game and/or feature game outcome, triggering one or more bonus games of a number of free spins. The bonus game outcome may include one or more prize symbols. In the example embodiment, the game tier persists from the base game to the bonus game, in that the prize awarded by the prize symbol is associated with a shared range of values and/or with a shared weighted/lookup table across the base game and the bonus game. The bonus game may complete/terminate upon a number of remaining free spins being zero. The completion/termination of the bonus game may trigger the base game and/or the feature game.

Certain technical problems arise when implementing an electronic game that includes game tiers. For example, in certain gaming devices that execute games that lack game tiers and include triggering a hold and spin feature may fail to establish a game tier system to determine award values in the hold and spin feature. For example, a gaming device can trigger a hold and spin feature by landing a certain number of award symbols in a base game. To populate the award symbols, the gaming device may use a weighted/lookup table that generates a range of award values in the base game. After entering the hold and spin feature, the gaming device may utilize one or more different weighted/lookup tables to generate the same range of award values in the feature. Thus, the gaming device can adjust the average payout/RTP allocated to the hold and spin feature to meet certain game design needs (e.g., game volatility). An EGM that lacks established and utilized game tiers for a transition from a base game to a bonus feature could cause player confusion and/or prevent players from fully understanding what the desired game outcome is in the game. For example, a lack of game tiers between a base game and a feature game and/or a bonus game may communicate a negative impact on award probability and/or consistency. Further, a lack of game tiers may provide a negative impact on award probability by providing only one lookup table from which to draw awards, rather than multiple lookup tables that remove lower awards in some of the game tiers. Further still, a gaming device that establishes and utilizes game tiers still needs to include proper control functions to implement the operation/capability while complying with gaming regulations, such as achieving a designated game RTP.

Accordingly, technical solutions are described herein to address at least the technical problems described above. A gaming device that establishes and utilizes game tiers may allow for the gaming device to maintain a randomly selected game tier from the bought game to any additional triggered game feature(s), which may result in a coupling between the base game spin and any additional features subsequently triggered that allows players to better understand or fulfill any expectation set in the base game and subsequent game feature(s). Technical solutions represented by the present disclosure include at least: (i) generating and causing display of an electronic game that may establish, control, and manage game tiers when triggering and transitioning from a base game to a feature game and/or a bonus game; (ii) generating and causing display of an electronic game that may randomly determine and maintain a game tier throughout one or more game features to improve player understandability and game expectation; (iii) generating and causing display of an electronic game that may provide an improved award probability by presenting multiple lookup tables that remove lower awards in some of the game tiers; (iv) generating and causing display of an electronic game that may provide an improved award probability by presenting a potential for shared awards from a game tier applied across a base game and a feature game and/or a bonus game; (v) saving computational resources for more efficient operation of a processor of an electronic game by maintaining a game tier from the bought game to any additional triggered game features, controlling randomized game tier determinations throughout gameplay; (vi) saving memory space of a memory device of an electronic game by associating all prizes with a game tier determination and maintaining the game tier from the bought game to any additional triggered game features, controlling randomized award determinations throughout gameplay; and (vii) achieving a designated RTP with a game tier that is maintained across the bought game and any additional triggered game features by controlling randomized game tier determinations and randomized award determinations throughout gameplay.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
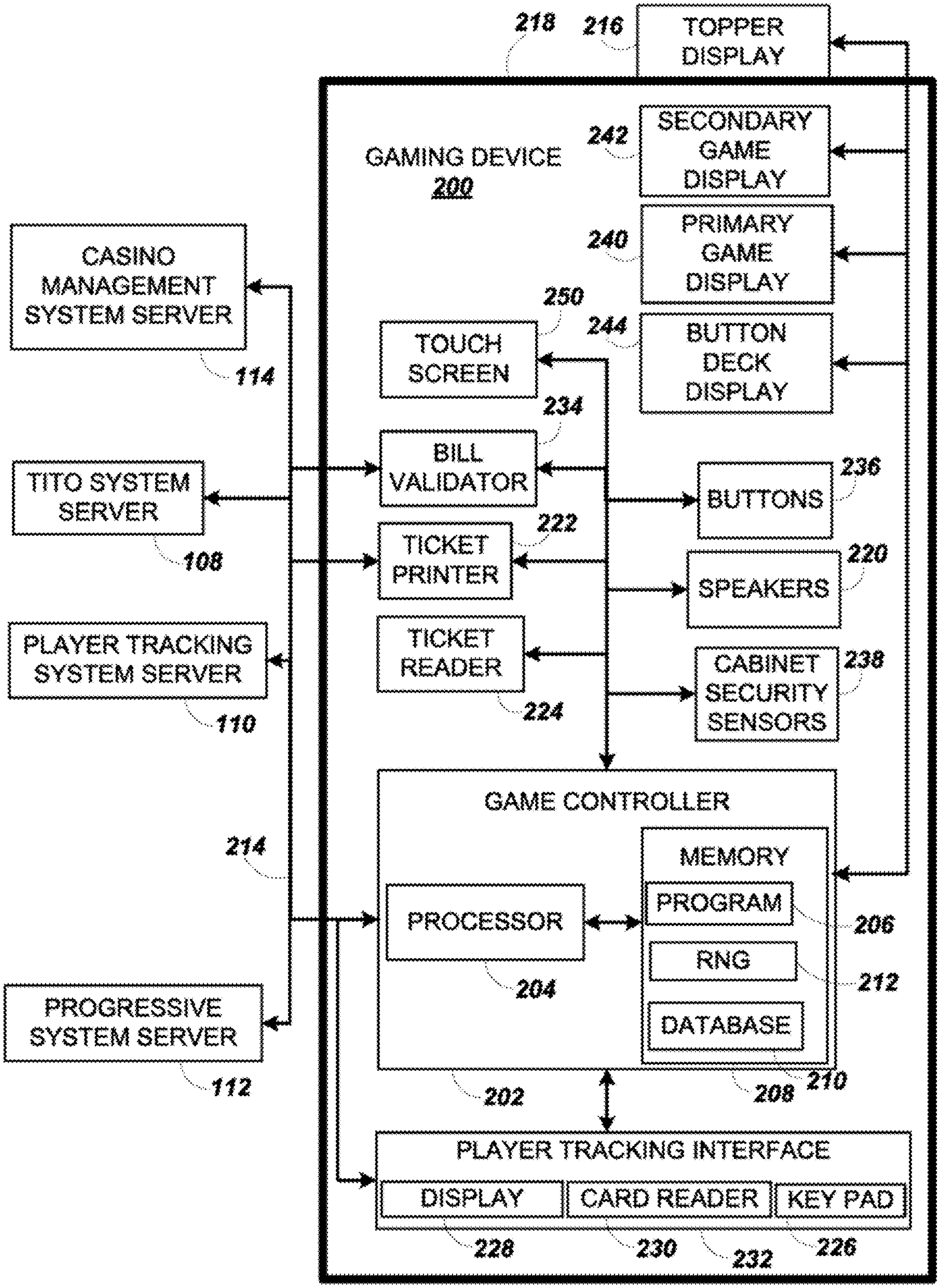
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class II or Class III, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
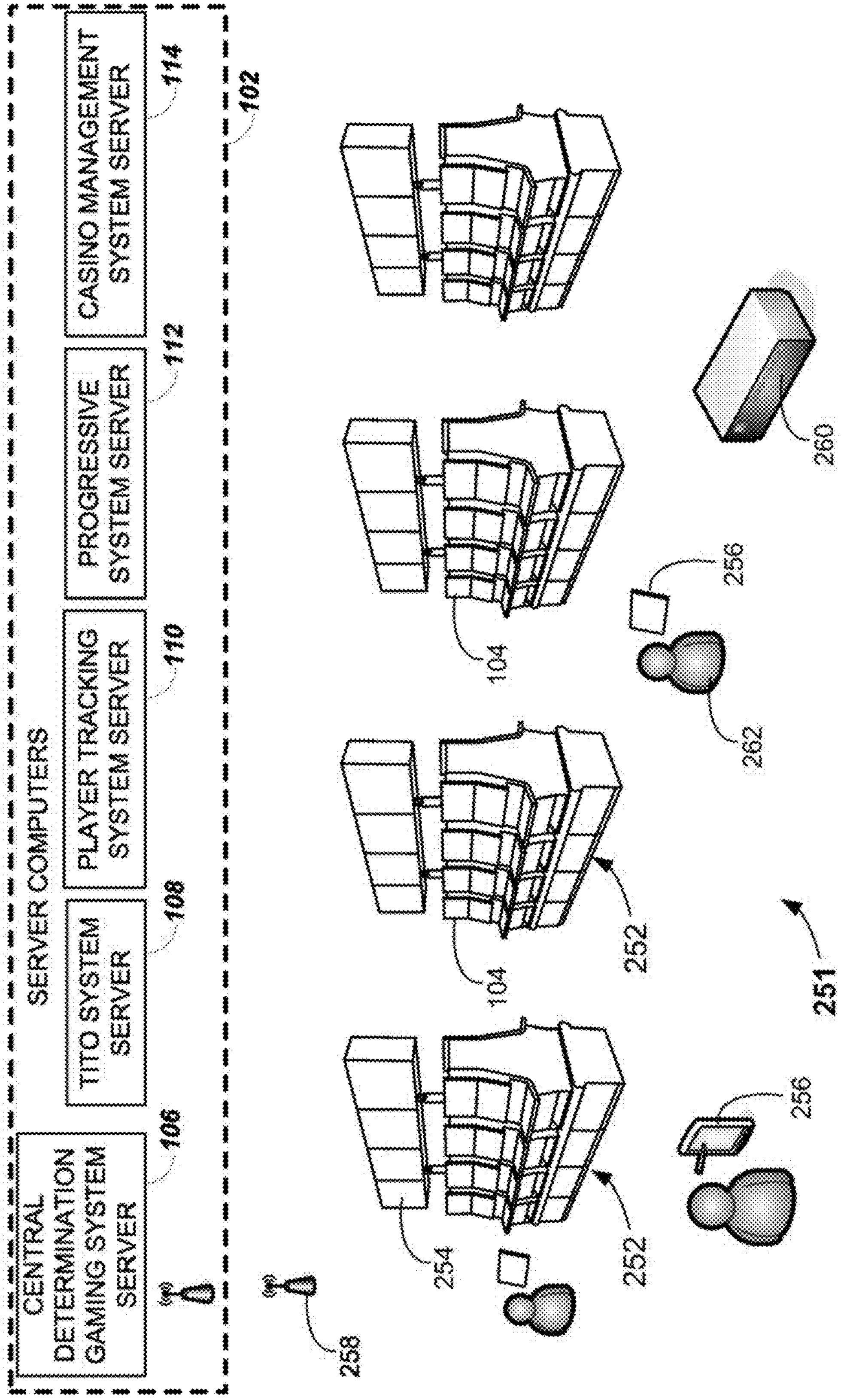
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
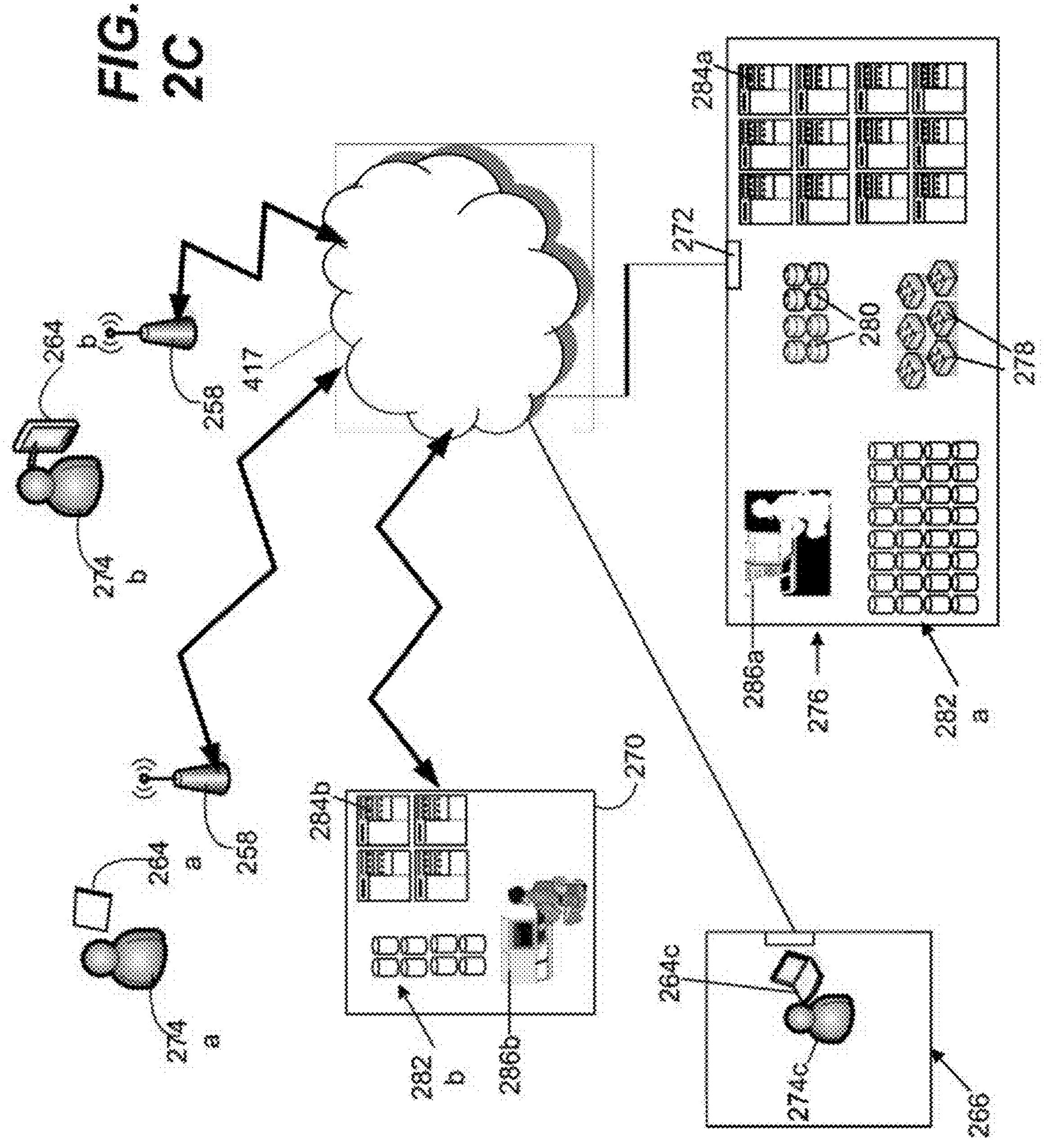
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
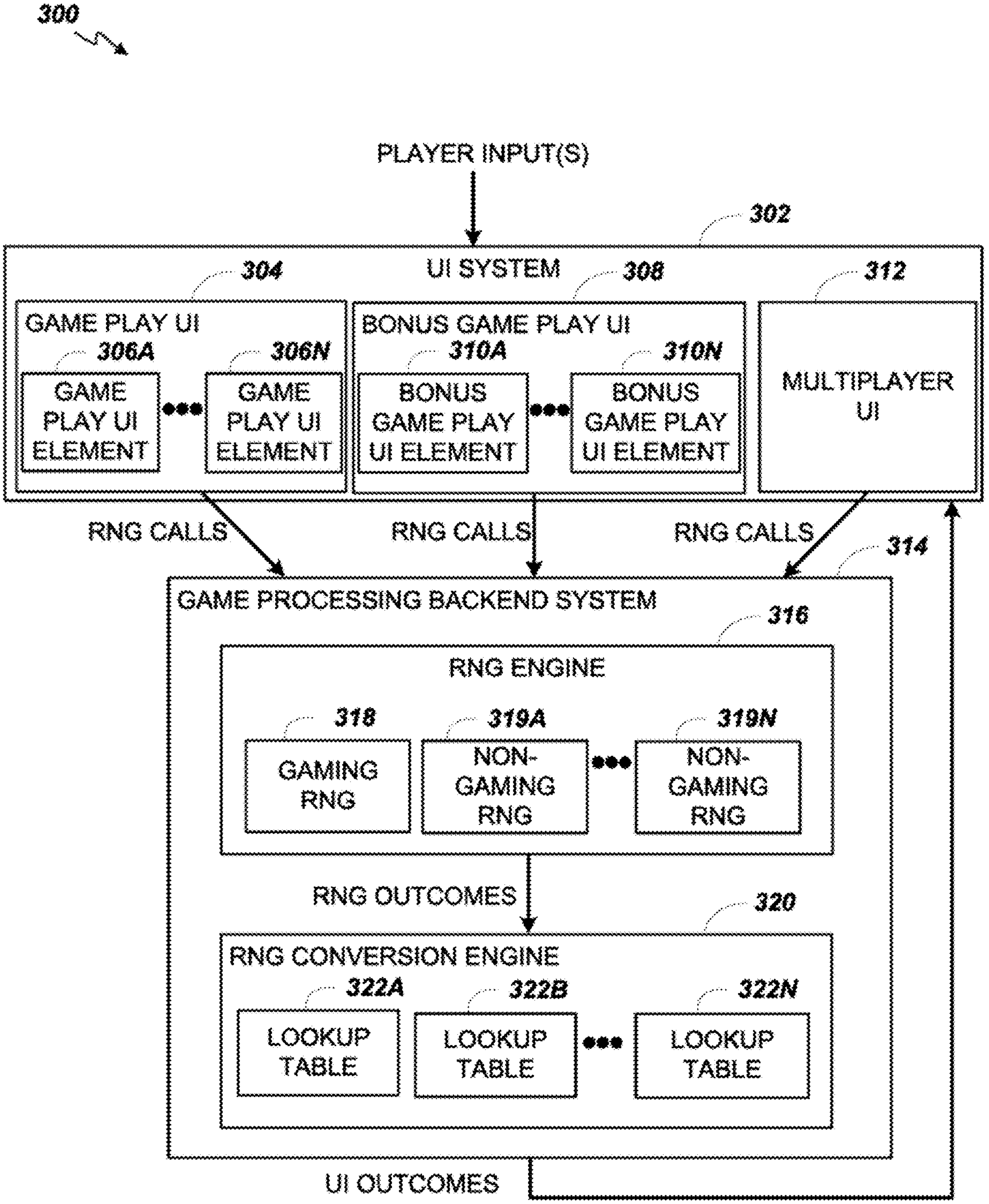
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4A:
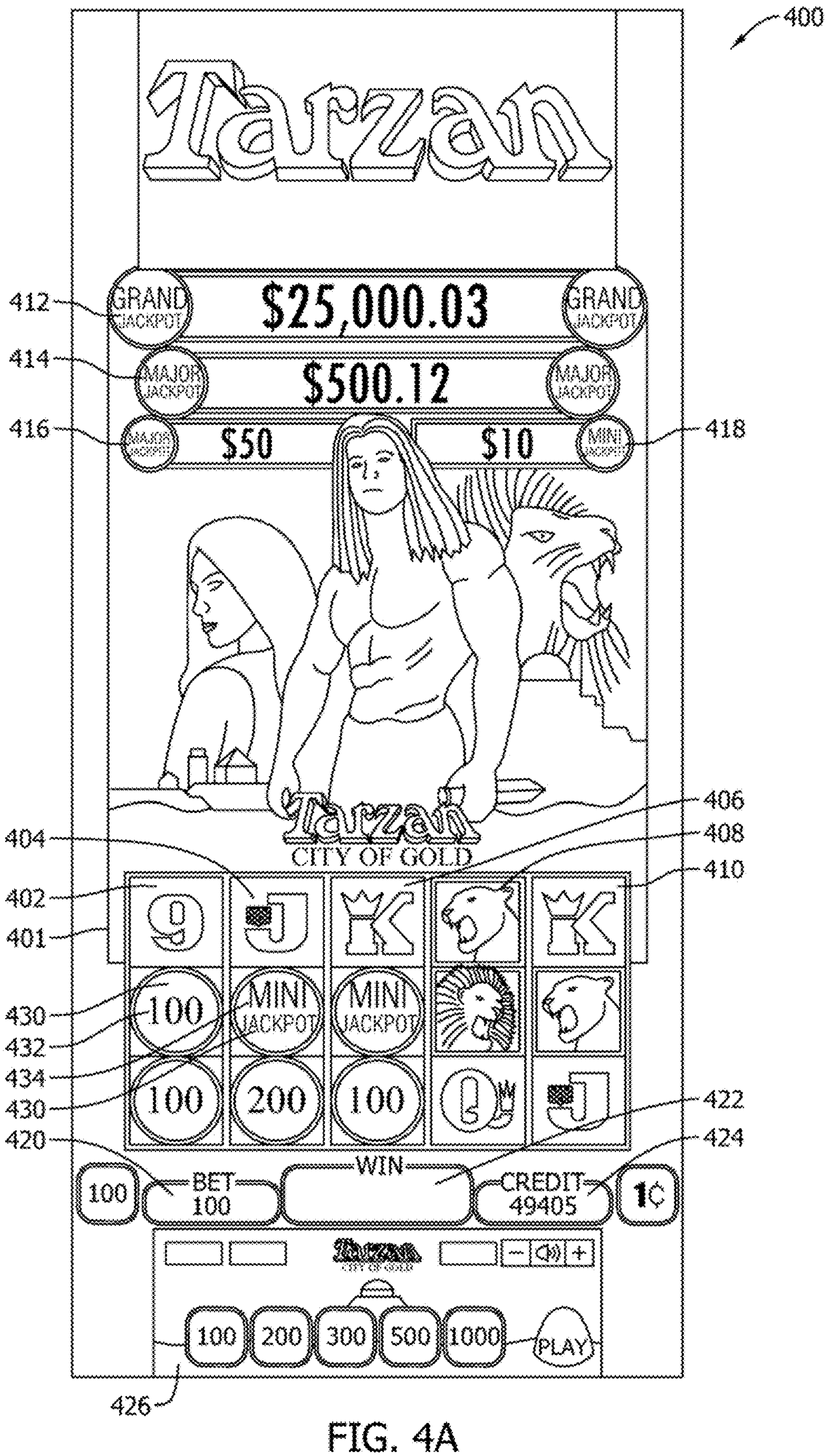
FIGS. 4A-4B are an example user interface or screenshot of a base game of an example electronic game played on an electronic gaming machine similar to the ones shown in FIG. 1.
Figure 4B:
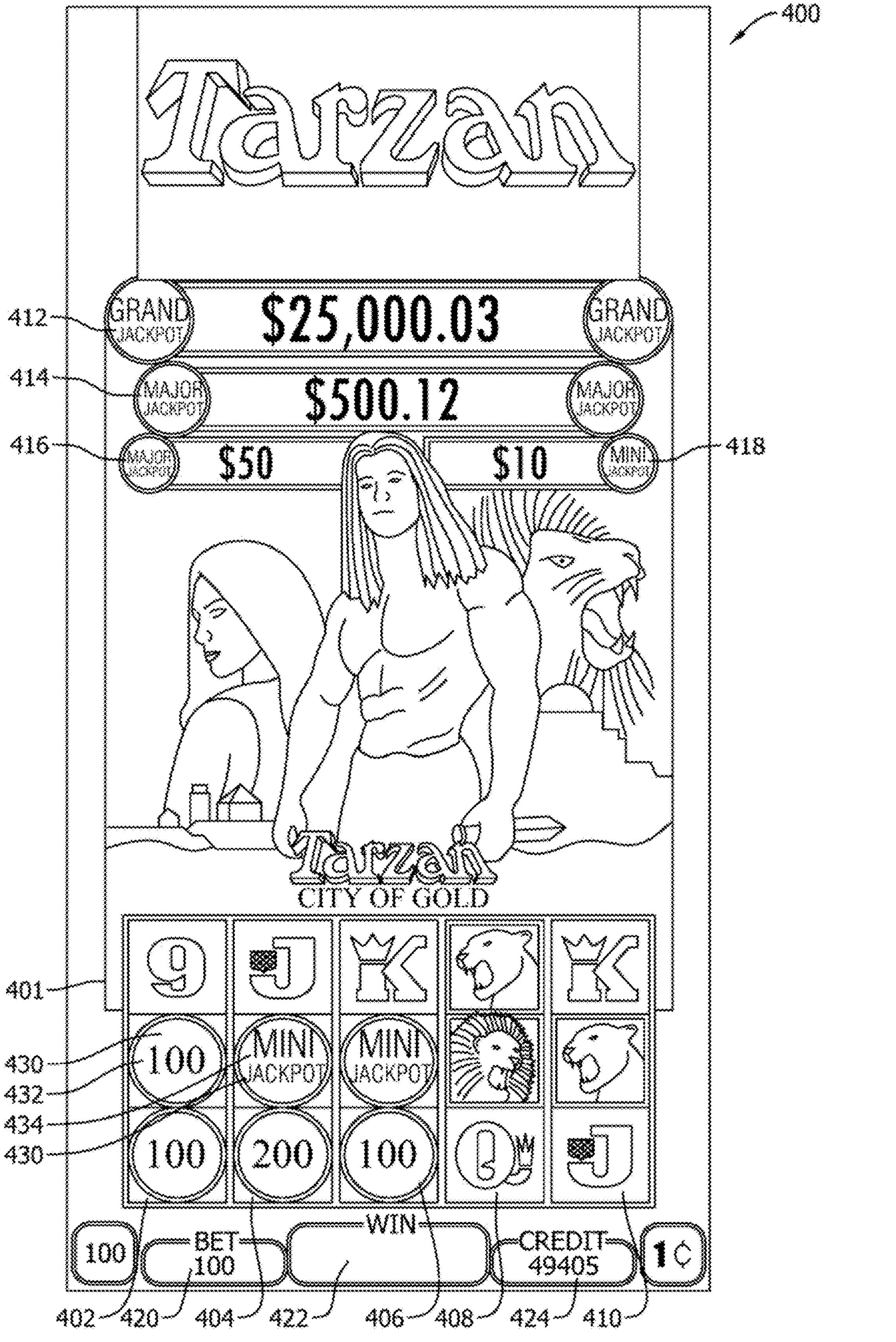
Figure 5:
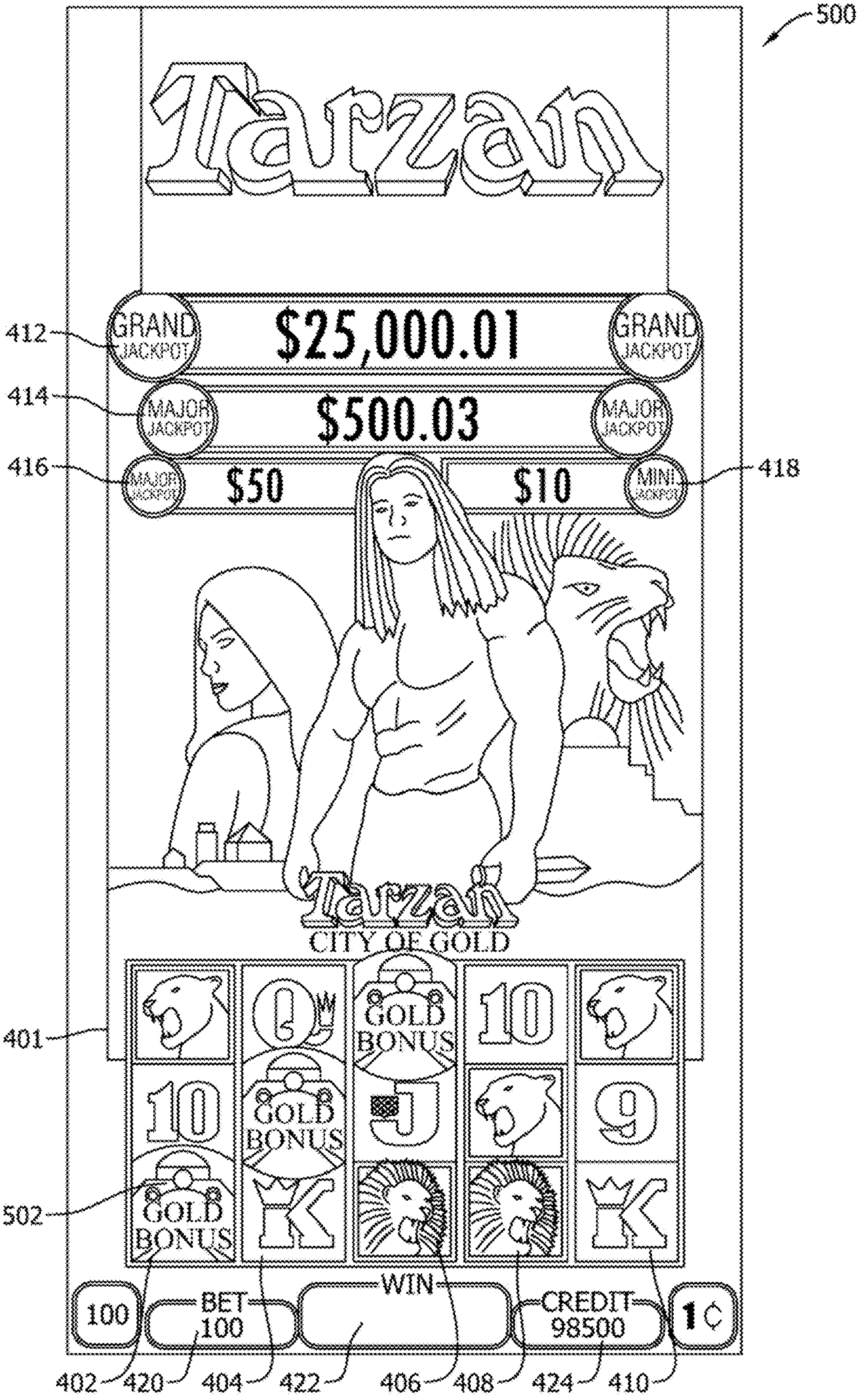
FIG. 5 is an example user interface or screenshot of the base game shown in FIGS. 4A-4B.

FIGS. 4A-4B are an example user interface or screenshot 400 of a base game of an exemplary electronic game in accordance with the present disclosure, with FIG. 4B showing a zoomed in perspective of the example user interface or screenshot 400. FIG. 5 is an example user interface or screenshot 500 of the base game of the exemplary electronic game, continuing the example of FIGS. 4A-4B (e.g., a subsequent base game outcome). In the example of FIGS. 4A-4B, a plurality of reels 402-410 are displayed in a primary game display area 401 of a gaming device (e.g., gaming devices 104A-104X, 256, and/or 264*a*-264*c*) by a game controller (e.g., game controller 202). While five reels 402-410 are shown in the example of FIG. 4, in some examples, more or fewer reels may be used. In some examples, reels 402-410 may be implemented as mechanical reels or may include virtual reels that are computer generated and displayed on a computer display screen/display device. As shown, each reel of reels 402-410 includes a plurality of symbol display positions for presenting symbols (and/or symbol combinations) which may be associated with winning and/or losing reel game outcomes and/or awards.

Game controller 202 (shown in FIG. 2A) may cause to be displayed a plurality of jackpot meters 412-418 (e.g., jackpots displaying a jackpot value) in primary game display area 401, including a grand jackpot meter 412, a major jackpot meter 414, a minor jackpot meter 416, and a mini jackpot meter 418. Game controller 202 may also cause to be displayed a bet meter 420, a win meter 422, and a credit meter 424. Bet meter 420 may display a bet value for each spin of reels 402-410. Win meter 422 may display a win value to be awarded to a player and/or a player account (e.g., a user) from spins of reels 402-410. Credit meter 424 may display a total credit value attributed to the player and/or the player account (e.g., the user). Game controller 202 may further cause to be displayed a bet display 426, shown in FIG. 4A. Bet display 426 may display a selection of bet options and may include a highlighted bet option that corresponds with the bet value displayed by bet meter 420.

In operation, game controller 202 may cause to be displayed a base game outcome including a plurality of symbols on reels 402-410. As shown in FIGS. 4A-4B, the plurality of symbols may include a prize symbol 430. Prize symbol 430 may be displayed to appear as a coin with an output overlaid on the coin. In some examples, prize symbol 430 may have an alternative appearance. The output may be one of a plurality of outputs, including, but not limited to, a credit output 432 and/or a jackpot output 434 corresponding to one of jackpot meters 412-418. Credit output 432 may be a multiple of the bet amount displayed by bet meter 420. In the example of FIGS. 4A-4B, credit output 432 of 100 and jackpot output 434 corresponding to mini jackpot meter 418 are displayed.

In some examples, prize symbol 430 may be a dynamic symbol, in that prize symbol 430 may be displayed on reels 402-410 without including an output (e.g., appearing blank) and the output (e.g., credit output 432 and/or jackpot output 434) may be overlaid on prize symbol 430. As shown in FIG. 5, the plurality of symbols may also include a bonus symbol 502. Bonus symbol 502 may appear to match the theme of the base game. For example, bonus symbol 502 may appear as a golden palace. In some examples, bonus symbol 502 may have an alternative appearance. The display of bonus symbol 502 may cause game controller 202 to initiate a bonus game of a number of free spins of reels 402-410.

In operation, game controller 202 may cause to be applied a game tier of a plurality of game tiers (not shown in the figures) to the base game, including, but not limited to, a first game tier, a second game tier, and a third game tier. The base game outcome may depend on the game tier, in that the plurality of outputs of prize symbol 430 (e.g., credit output 432 and/or jackpot output 434) and/or the number of free spins awarded by bonus symbol 502 may vary based on the game tier. The game tier may be maintained across the base game and a feature game and/or a bonus game, facilitating the achievement of a designated RTP by controlling randomized game tier determinations and randomized output determinations for prize symbol 430 throughout gameplay.

For example, credit output 432 may be a multiple of the bet amount displayed by bet meter 420. The multiplier applied to the bet amount may depend on the game tier, in that the game tier may be associated with a range of multiplier values (e.g., multiplier range). In the example of FIGS. 4A-4B, the bet amount displayed by bet meter 420 is 100 credits, making the multiplier ×1 for the credit output 432 of 100 displayed on reel 402 and the multiplier ×2 for the credit output 432 of 200 displayed on reel 404. As shown in Table 1, the first game tier may be associated with a range of multiplier values (such as, but not limited to, ×1-×100), the second game tier may be associated with a subset of the range (e.g., a top portion of the range) of multiplier values (such as, but not limited to, ×5-×100), and the third game tier may be associated with a second subset of the range of multiplier values (such as, but not limited to, ×50-×100). In some examples, a weighted/lookup table to populate values of credit output 432 in a base game and a feature game may be as follows.

TABLE 1

| GAME TIER 1 | GAME TIER 2 | GAME TIER 3 |
|---|---|---|
| MAJOR | MAJOR | MAJOR |
| MINOR | MINOR | MINOR |
| MINI | MINI | |
| X100 | X100 | X100 |
| X50 | X50 | X50 |
| X20 | X20 | |
| X15 | X15 | |
| X10 | X10 | |
| X5 | X5 | |
| X4 | | |
| X3 | | |
| X2 | | |
| X1 | | |

Additionally, for example, jackpot meters 412-418 associated with jackpot output 434 may vary based on the game tier, in that jackpot output 434 may only be associated with a selection of jackpot meters 412-418 based on the game tier. For example, the first game tier may associate jackpot output 434 with any of jackpot meters 412-418, the second game tier may associate jackpot output 434 with a subset of jackpot meters 412-418 (such as, but not limited to, grand jackpot meter 412, major jackpot meter 414, and minor jackpot meter 416), and the third game tier may associate jackpot output 434 with a second subset of jackpot meters 412-418 (such as, but not limited to, grand jackpot meter 412 and major jackpot meter 414). As shown in Table 1, the second subset of jackpot meters 412-418 availed with the third game tier may be a subgroup of the first subset of jackpot meters 412-418 available with the second game tier. For example, the third game tier may not include the "mini" jackpot prize, so that the third game tier is associated with a higher probability of landing larger jackpot prizes.

Furthermore, for example, the number of free spins awarded by bonus symbol 502 may vary based on the game tier. For example, the first game tier may be associated with a first number of free spins, the second game tier may be associated with a second number of free spins (such as, but not limited to, a number greater than the first number of free spins), and the third game tier may be associated with a third number of free spins (such as, but not limited to, a number greater than both the first number and second number of free spins).

In operation, the appearance of prize symbol 430 as caused to be displayed by game controller 202 may vary based on the game tier, in that an outline color around prize symbol 430 may vary based on the game tier. For example, the outline color of prize symbol 430 may appear as any of gold, purple, and/or blue for the first game tier, purple and/or blue for the second game tier, and blue for the third game tier. In the example of FIGS. 4A-4B, the first game tier is applied, communicated to a user by the outline colors of prize symbol 430, which appears as gold and purple.

Additionally, in operation, the appearance of bonus symbol 502 as caused to be displayed by game controller 202 may vary based on the game tier. For example, bonus symbol 502 may appear as "GOLD BONUS" for the first game tier, "SUPER GOLD BONUS" with purple text outline for the second game tier, and "SUPER GOLD BONUS" with blue text outline for the third game tier. In the example of FIG. 5, the first game tier is applied, communicated to a user by bonus symbol 502, which appears as "GOLD BONUS."

In operation, each spin of reels 402-410 in the base game may cause game controller 202 to apply a game tier of the plurality of game tiers to the base game. For each subsequent spin of reels 402-410 in the base game, the game may be the same and/or a different game tier as the previous spin of reels 402-410 in the base game. Prior to display of the base game outcome for each spin of reels 402-410, controller 202 may cause an evaluation of a game tier lookup table (not shown in figures) saved in memory. The game tier lookup table may include the plurality of game tiers and game controller 202 may cause to be selected and applied a game tier of the plurality of game tiers. The game tier lookup table may be weighted, in that the probability of selecting each of the plurality of game tiers may vary. For example, the better the prizes available in the game tier, the lower the probability may be of the game tier being selected from the game tier lookup table. In some examples, the selection of the game tier from the game tier lookup table may be random for an RNG based game, such as a Class III slot game. In other examples, the selection of the game tier from the game tier lookup table may be in a predetermined order.

Following the selection of the game tier from the game tier lookup table, controller 202 may cause an evaluation of one or more of an output lookup table (not shown in figures) saved in memory. The one or more output lookup table may include the plurality of outputs of prize symbol 430 (e.g., credit output 432 and/or jackpot output 434) and/or the plurality of the number of free spins associated with bonus symbol 502. Each output lookup table may correspond to a game tier. For example, each output lookup table may correspond to one of the first game tier, the second game tier, and/or the third game tier. Each output lookup table may include the plurality of outputs of prize symbol 430 and/or the plurality of the number of free spins associated with bonus symbol 502 that are available with the corresponding game tier.

Figure 6:
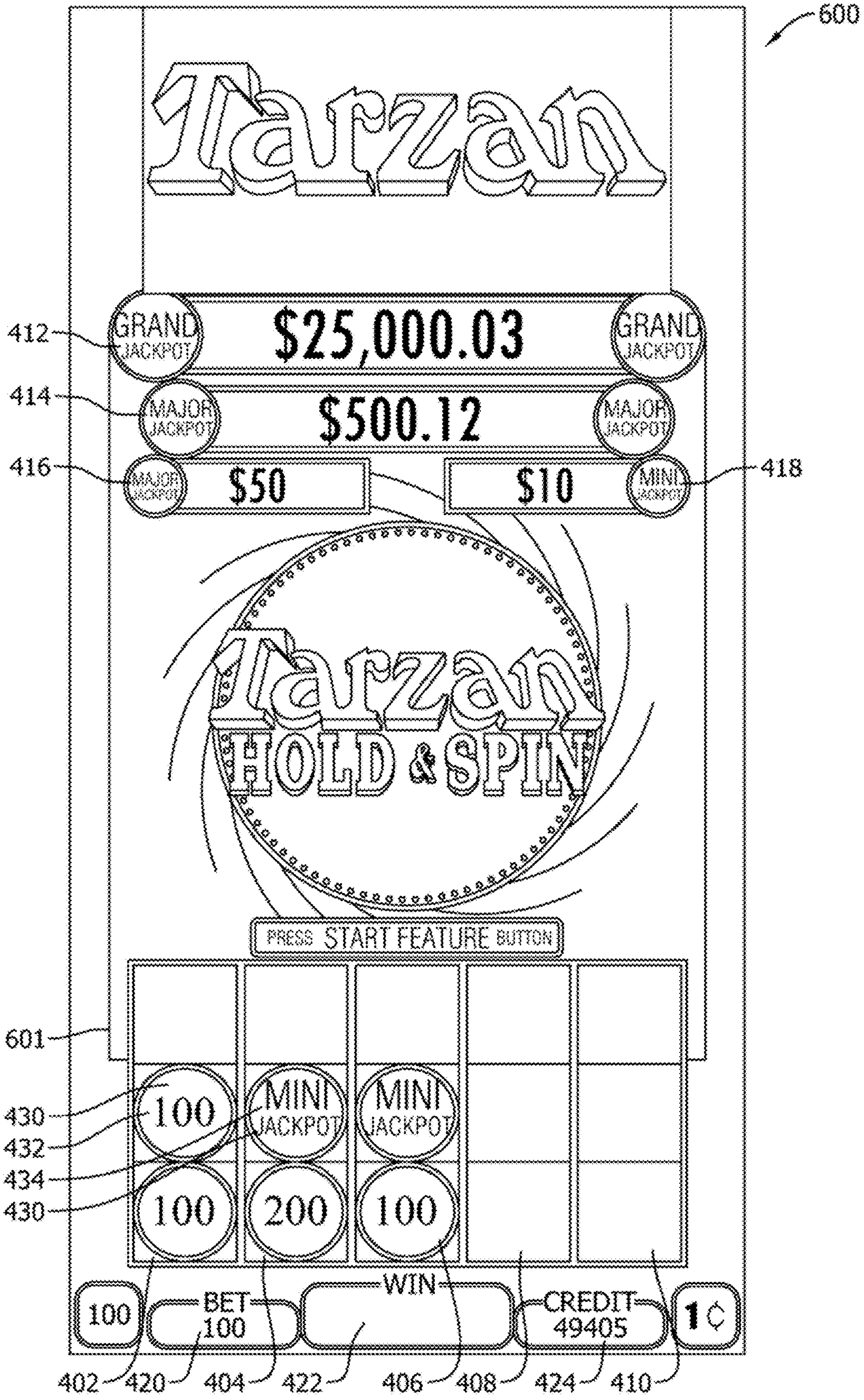
FIGS. 6-7 are example user interfaces or screenshots of a feature game of the example electronic game, continuing the base game example of FIGS. 4A-4B.
Figure 7:
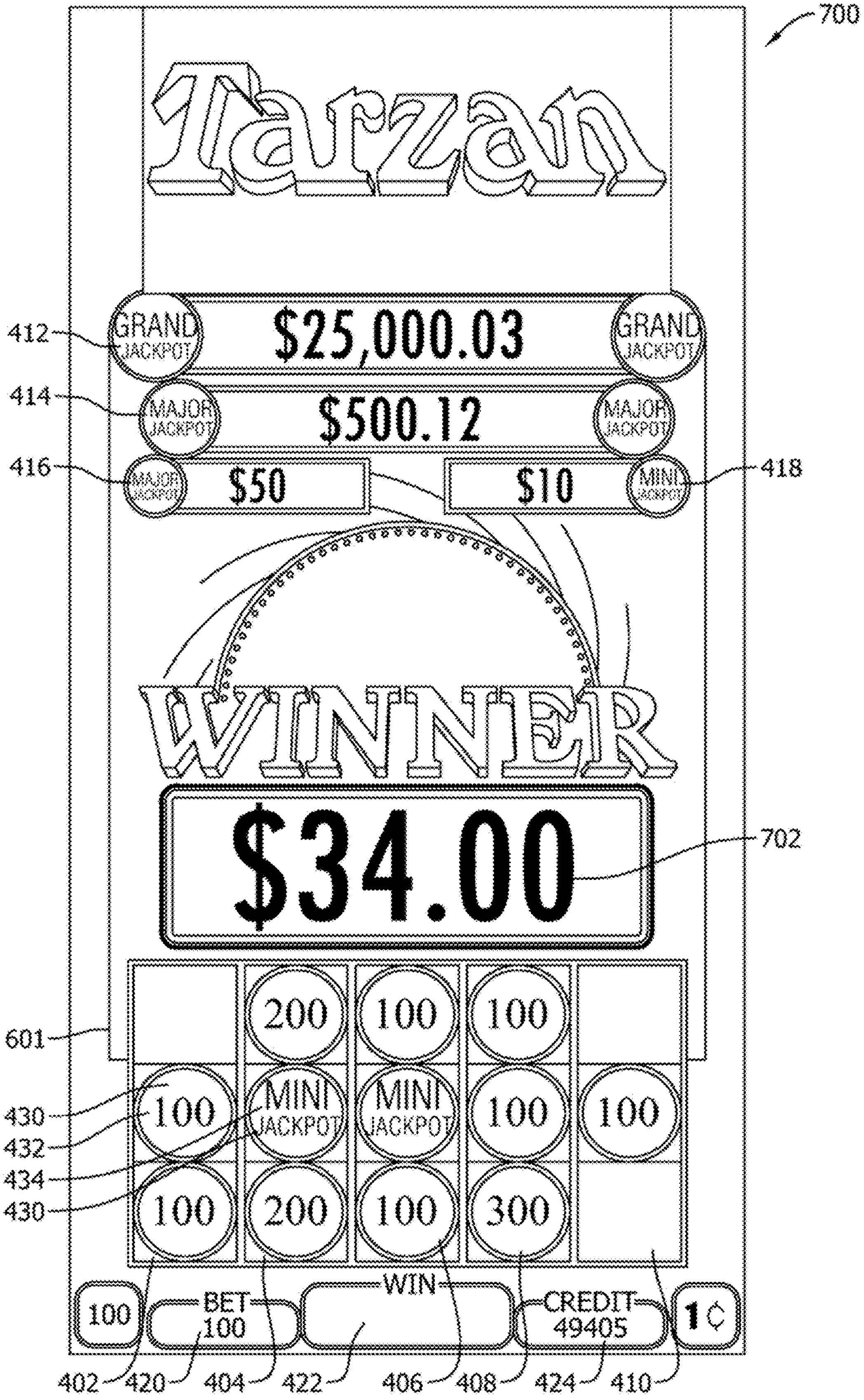

FIGS. 6-7 are example user interfaces or screenshots 600-700 of a feature game of the exemplary electronic game in accordance with the present disclosure, continuing from the base game example of FIGS. 4A-4B. In the examples of FIGS. 6-7, reels 402-410 are displayed in a secondary game display area 601 of the gaming device (e.g., gaming devices 104A-104X, 256, and/or 264*a*-264*c*) by the game controller (e.g., game controller 202). The display of one or more of prize symbol 430 during the base game may cause game controller 202 (shown in FIG. 2A) to initiate the feature game. In the example of FIGS. 4A-4B, four of prize symbol 430 are displayed, causing game controller 202 to initiate the feature game as shown in FIG. 6. The feature game may include a number of additional spins of reels 402-410 and may apply a hold and spin mechanic to additional spins. The feature game may complete/terminate following the additional spins of reels 402-410. Upon completion/termination of the feature game, game controller 202 may cause to be displayed and awarded a total output 702 that is a sum of all outputs (e.g., credit output 432 and jackpot output 434) as displayed by one or more of prize symbol 430 and may also cause the base game be to initiated. In the example of FIG. 7 (e.g., a subsequent feature game outcome), total output 702 of $34.00 is displayed, which is the sum of the outputs (e.g., a sum of the more than one additional prize symbol) as displayed by the twelve of prize symbol 430 (e.g., two mini jackpot awards of $10 each and ten credit awards of $14 total).

The hold and spin mechanic may cause the prize symbol 430 to be persistent, or "sticky," from the base game to the feature game, in that prize symbol 430 may remain in the same symbol position in the feature game as in the triggering base game outcome. In the example of FIG. 6, the multiple of prize symbol 430 are displayed in the same symbol positions as the multiple of prize symbol 430 in the triggering base game outcome shown in FIGS. 4A-4B. Additionally, the hold and spin mechanic may cause the prize symbol 430 to be persistent, or "sticky," for each of the number of additional spins of reels 402-410 in the feature game. In the example of FIG. 7, the multiple of prize symbol 430 are displayed in the same symbol positions as the multiple of prize symbol 430 in the previous feature game outcome shown in FIG. 6.

The hold and spin mechanic may also cause each symbol display position in the feature game to be its own reel, in that each of the symbols displayed in the feature game that are not prize symbol 430 may appear to be spun in their individual boxes/symbol display positions. In operation, game controller 202 may cause to be displayed the one or more of prize symbol 430 that persist from the base game to the feature game as full-color and the other symbols that do not persist from the base game to the feature game as darkened/dimmed to communicate the persisting symbols to a user. For example, as shown in FIG. 6, the multiple of prize symbol 430 are displayed to appear as full-color and the other symbols that did not persist from the base game (as shown in FIGS. 4A-4B) to the feature game are displayed to appear as darkened/dimmed.

In operation, each spin of reels 402-410 in the feature game may cause game controller 202 to apply the game tier as applied to the base game, in that any symbols spun in their individual boxes/symbol display positions in the feature game for subsequent spins of reels 402-410 may be based on the game tier as applied to the base game. Thus, the feature game outcome may depend on the game tier of the base game, in that the plurality of outputs of prize symbol 430 (e.g., credit output 432 and/or jackpot output 434) and/or the number of free spins associated with bonus symbol 502 may be the same to those of the base game. The application of the game tier of the base game to the feature game may facilitate the achievement of a designated RTP by controlling randomized game tier determinations throughout gameplay. In operation, the controller 202 may cause an evaluation of the one or more output lookup tables (not shown in figures) saved in memory to display only outputs applicable to the applied game tier. In the example of FIG. 7, the symbols spun in their individual boxes/symbol display positions in the feature game for subsequent spins of reels 402-410 are displayed and the outputs of these symbols depend on the game tier of the base and feature game (e.g., the first game tier for the examples of FIGS. 5-7). The evaluation of only specific output lookup tables for outputs in the feature game applicable to the applied game tier may facilitate the achievement of a designated RTP by controlling randomized award determinations throughout gameplay.

In some examples, a spin of reels 402-410 in the feature game may cause game controller 202 to apply a different game tier than as applied to the base game based on the appearance of one or more of prize symbol 430 and/or one or more of bonus symbol 502 displayed in the feature game outcome. For example, the spin of reels 402-410 in the feature game may display one or more of prize symbol 430 appearing to have an outline color corresponding to a specific game tier (such as purple and/or blue for the second game tier). Additionally, for example, the spin of reels 402-410 in the feature game may display one or more of bonus symbol 502 appearing with a text outline color corresponding to a specific game tier (such as "SUPER GOLD BONUS" with purple text outline for the second game tier). This may cause game controller 202 to cause a change to the game tier as applied to the feature game. This change to the game tier may require a common appearance of prize symbol 430 and/or bonus symbol 502. For example, a spin of reels 402-410 in the feature game may cause game controller 202 to change the game tier from the first game tier to the second game tier, as both the first and second game tier share the prize symbol 430 outline colors of purple and blue. However, game controller 202 would not be able to change the game tier from the third game tier to the second game tier, as the third game tier does not share the prize symbol 430 outline color of purple.

For example, for the remaining additional spins of reels 402-410 of the feature game applying the hold and spin mechanic, the game tier may be changed based on the appearance of prize symbol 430 and/or bonus symbol 502 in a single feature game outcome. In some examples, the change of the game tier during the feature game may only be a change to a "higher" game tier (e.g., from the first game tier to the second and/or third game tier, or the second game tier to the third game tier), acting as a game tier upgrade. The game tier upgrade may only apply to the additional spins of reels 402-410 in that instance of the feature game, in that the game tier may revert back to the game tier of the base game following the completion/termination of that instance of the feature game.

Figure 8:
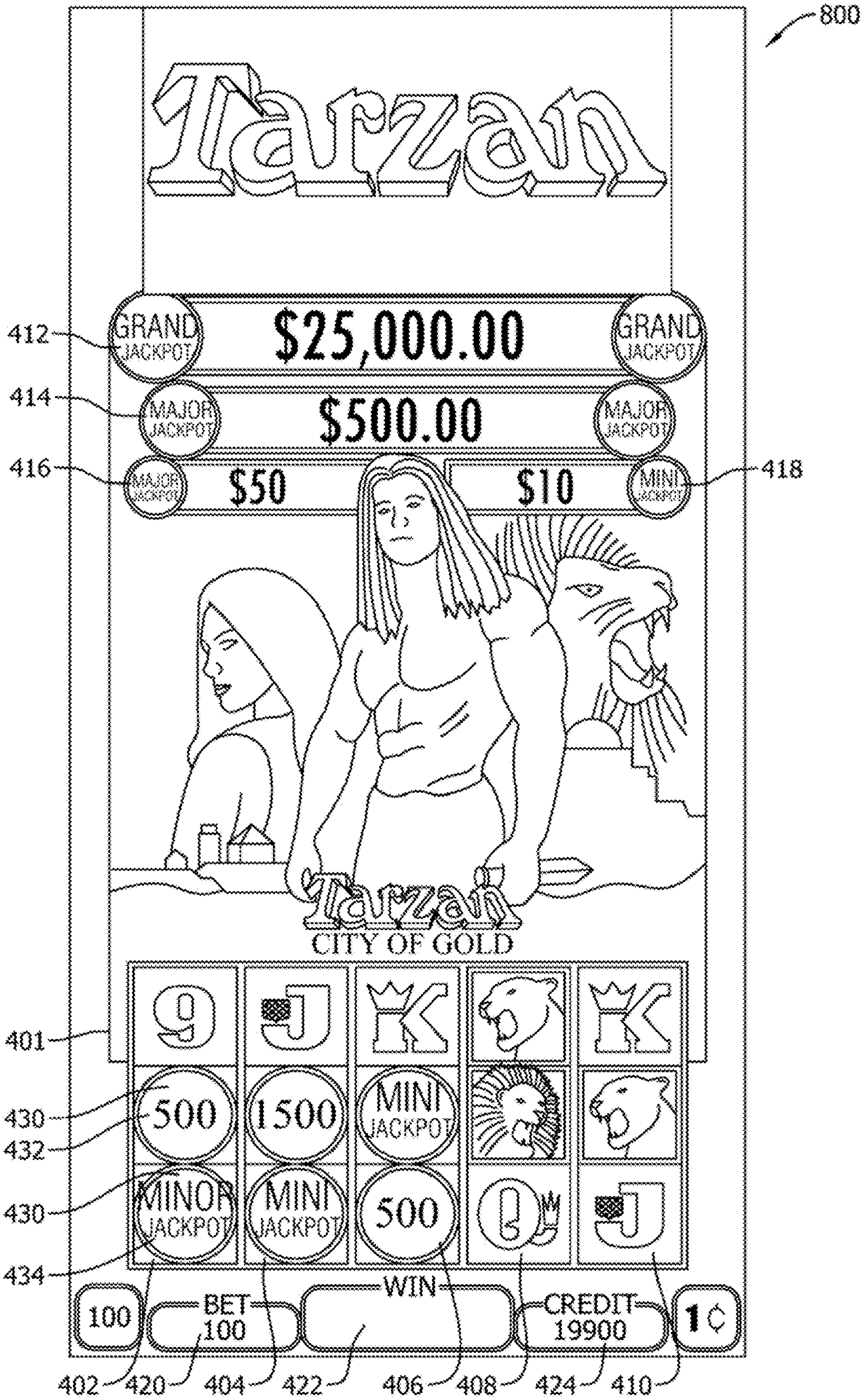
FIG. 8 is an example user interface or screenshot of the base game of the example electronic game.

FIG. 8 is an example user interface or screenshot 800 of the base game of the exemplary electronic game in accordance with the present disclosure. In the example of FIG. 8, the base game outcome includes six of prize symbol 430, with three of prize symbol 430 including credit output 432 and three of prize symbol 430 including jackpot output 434. In the example of FIG. 8, the second game tier is applied, communicated to a user by the outline color of prize symbol 430, which appears as blue and purple.

Figure 9:
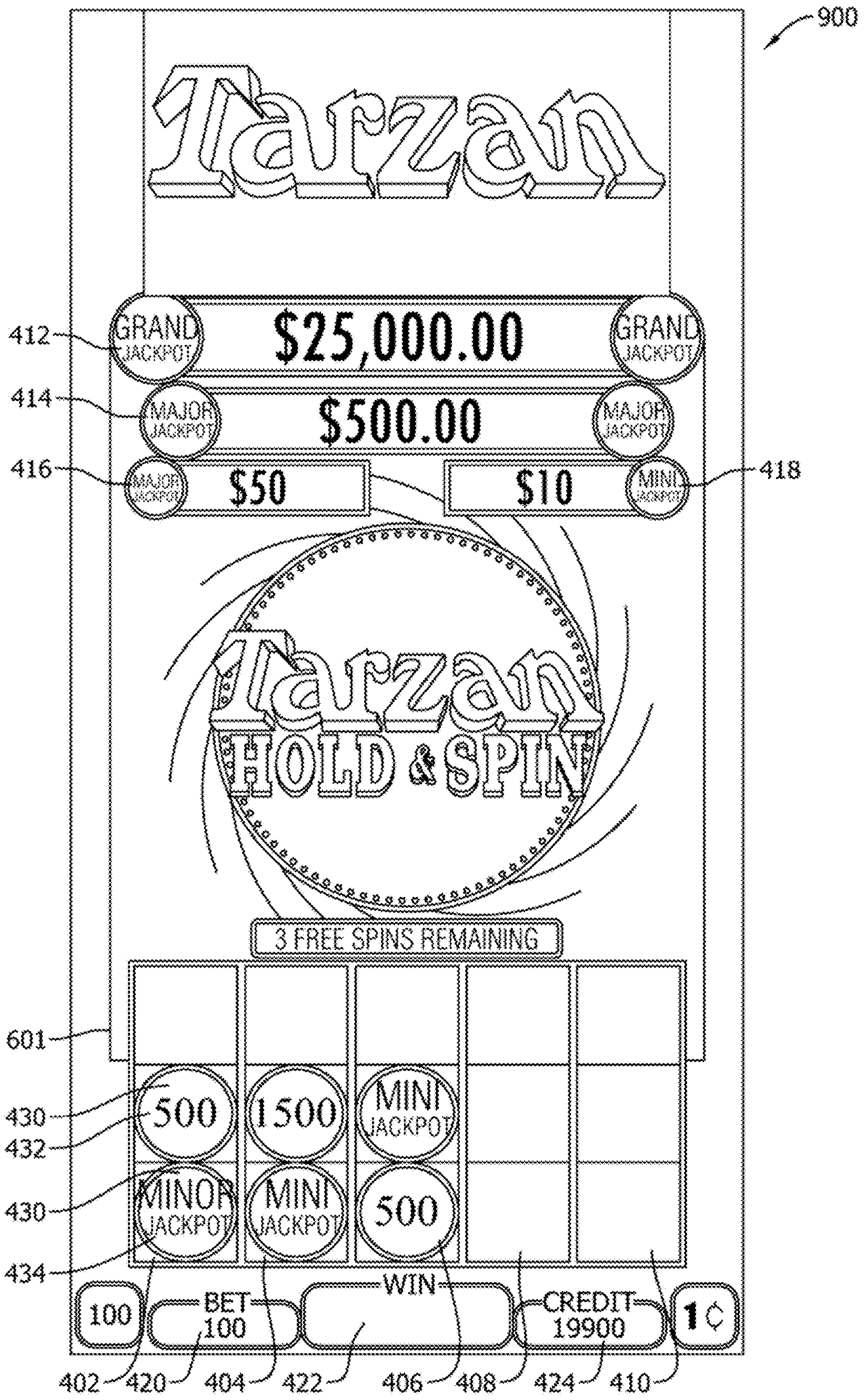
FIGS. 9-10 are example user interfaces or screenshots of the feature game of the example electronic game, continuing the base game example of FIG. 8.
Figure 10:
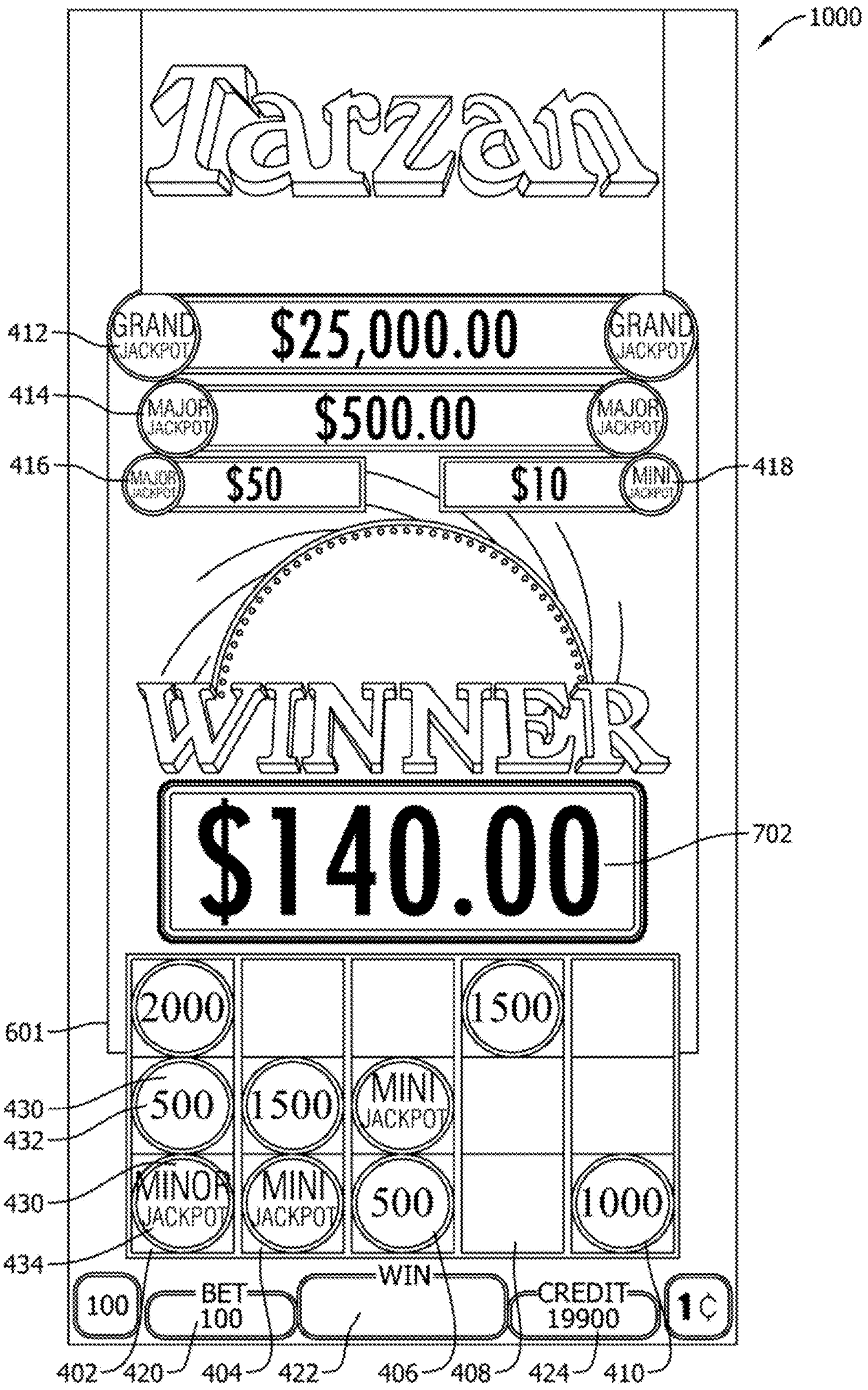

FIGS. 9-10 are example user interfaces or screenshots 900-1000 of the feature game of the exemplary electronic game, continuing from the base game example of FIG. 8. In the example of FIG. 9, the multiple of prize symbol 430 that persisted from the base game (as shown in FIG. 8) are displayed to appear as full-color and the other symbols that did not persist from the base game to the feature game are displayed to appear as darkened/dimmed. In the example of FIG. 10, the symbols spun in their individual boxes/symbol display positions in the feature game for subsequent spins of reels 402-410 are displayed and the outputs of these symbols depend on the game tier of the base game (e.g., the first game tier for the examples of FIGS. 8-10).

Figure 11:
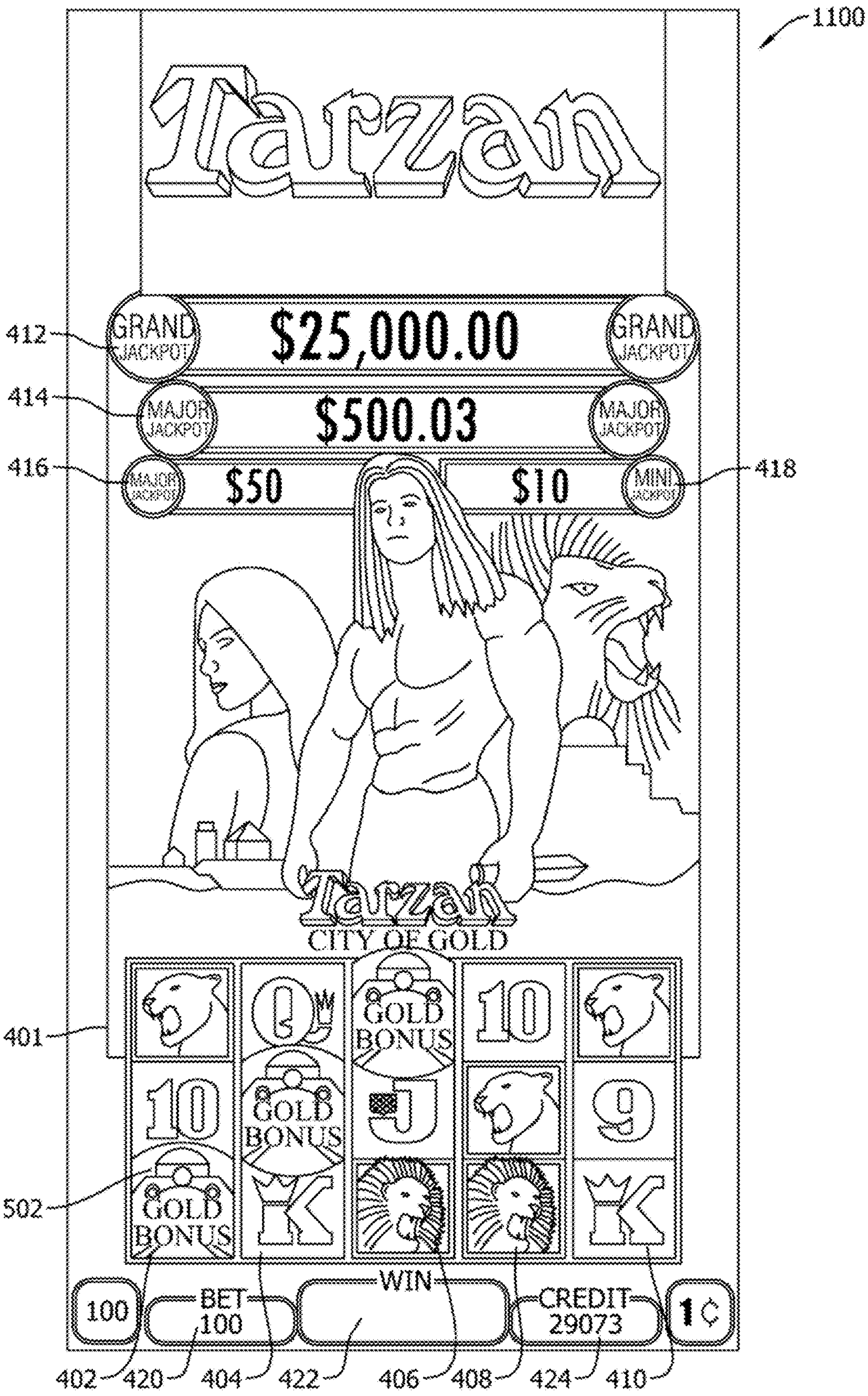
FIG. 11 is an example user interface or screenshot of the base game shown in FIG. 8.

FIG. 11 is an example user interface or screenshot 1100 of the base game of the exemplary electronic game, continuing the example of FIG. 8. In the example of FIG. 11, the display of bonus symbol 502 depends on the game tier of the base game (e.g., "SUPER GOLD BONUS" with purple text outline for the second game tier).

Figure 12:
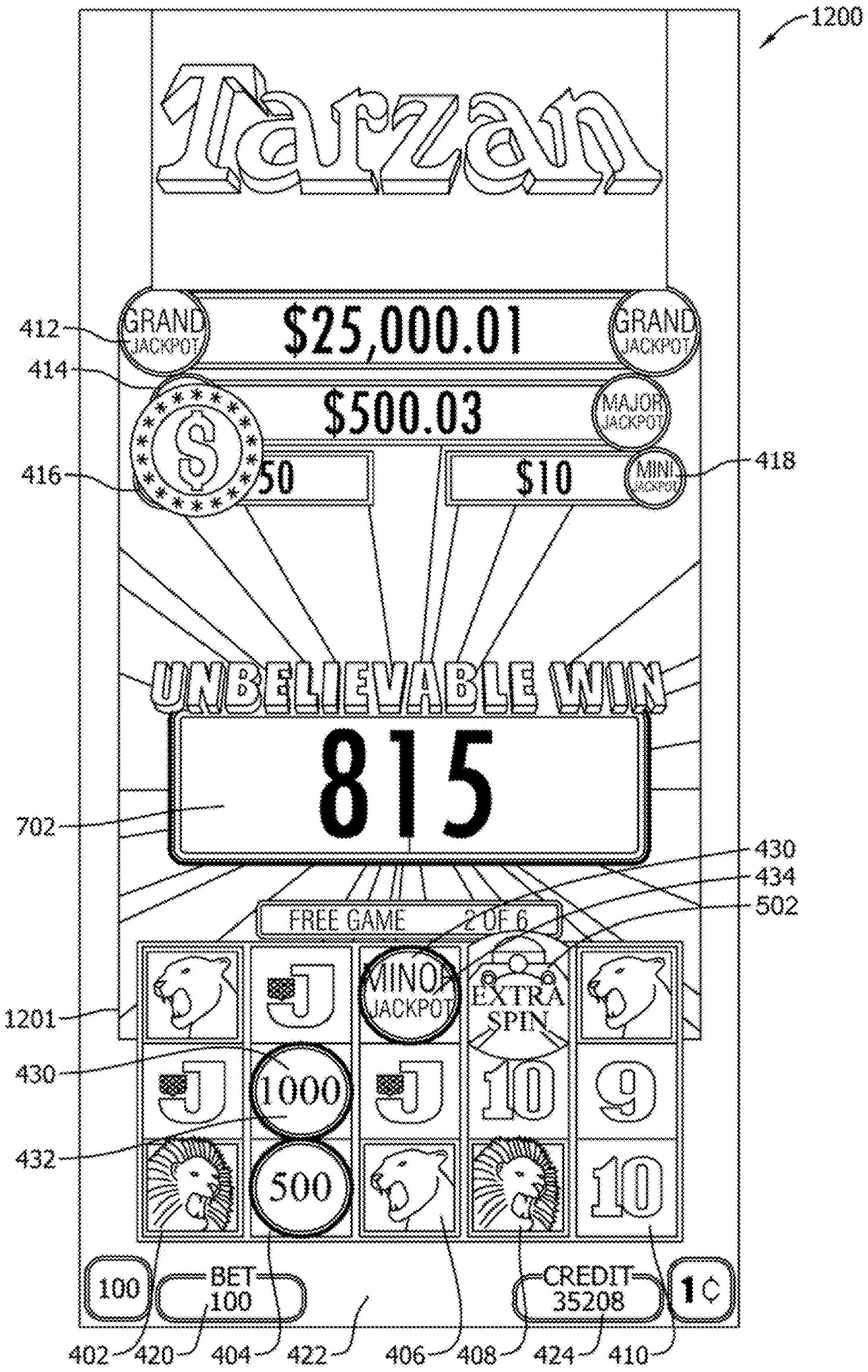
FIG. 12 is an example user interface or screenshot of a bonus game of the example electronic game, continuing the base game example of FIG. 11.

FIG. 12 is an example user interface or screenshot 1200 of a bonus game of the exemplary electronic game in accordance with the present disclosure, continuing from the base game example of FIG. 11. The bonus game may be triggered from the base game and/or the feature game. In the example of FIG. 12, reels 402-410 are displayed in a bonus game display area 1201 of the gaming device (e.g., gaming devices 104A-104X, 256, and/or 264*a*-264*c*) by the game controller (e.g., game controller 202). The display of one or more of bonus symbol 502 on reels 402-410 during the base game and/or the feature game may cause game controller 202 (shown in FIG. 2A) to initiate the bonus game. The bonus game may include a number of free spins of reels 402-410. The bonus game may complete/terminate following the number of free spins of reels 402-410. Upon completion/termination of the bonus game, game controller 202 may cause the base game and/or the feature game to be initiated.

In operation, each spin of reels 402-410 in the bonus game may cause game controller 202 to apply the game tier as applied to the base game, in that the symbols displayed by any subsequent spins of reels 402-410 may be based on the game tier. Thus, the bonus game outcome may depend on the game tier of the base game, in that the plurality of outputs of prize symbol 430 (e.g., credit output 432 and/or jackpot output 434) may be the same as those of the base game. The application of the game tier of the base game to the bonus game may facilitate the achievement of a designated RTP by controlling randomized game tier determinations throughout gameplay. In operation, the controller 202 may cause an evaluation of the one or more output lookup tables (not shown in figures) saved in memory to display only outputs applicable to the applied game tier. In the example of FIG. 12, the symbols resulting from subsequent spins of reels 402-410 in the bonus game are displayed and the outputs of these symbols depend on the game tier of the base and bonus games (e.g., the second game tier for the examples of FIGS. 11-12). The evaluation of only specific output lookup tables for outputs in the bonus game applicable to the applied game tier may facilitate the achievement of a designated RTP by controlling randomized award determinations throughout gameplay.

Figure 13:
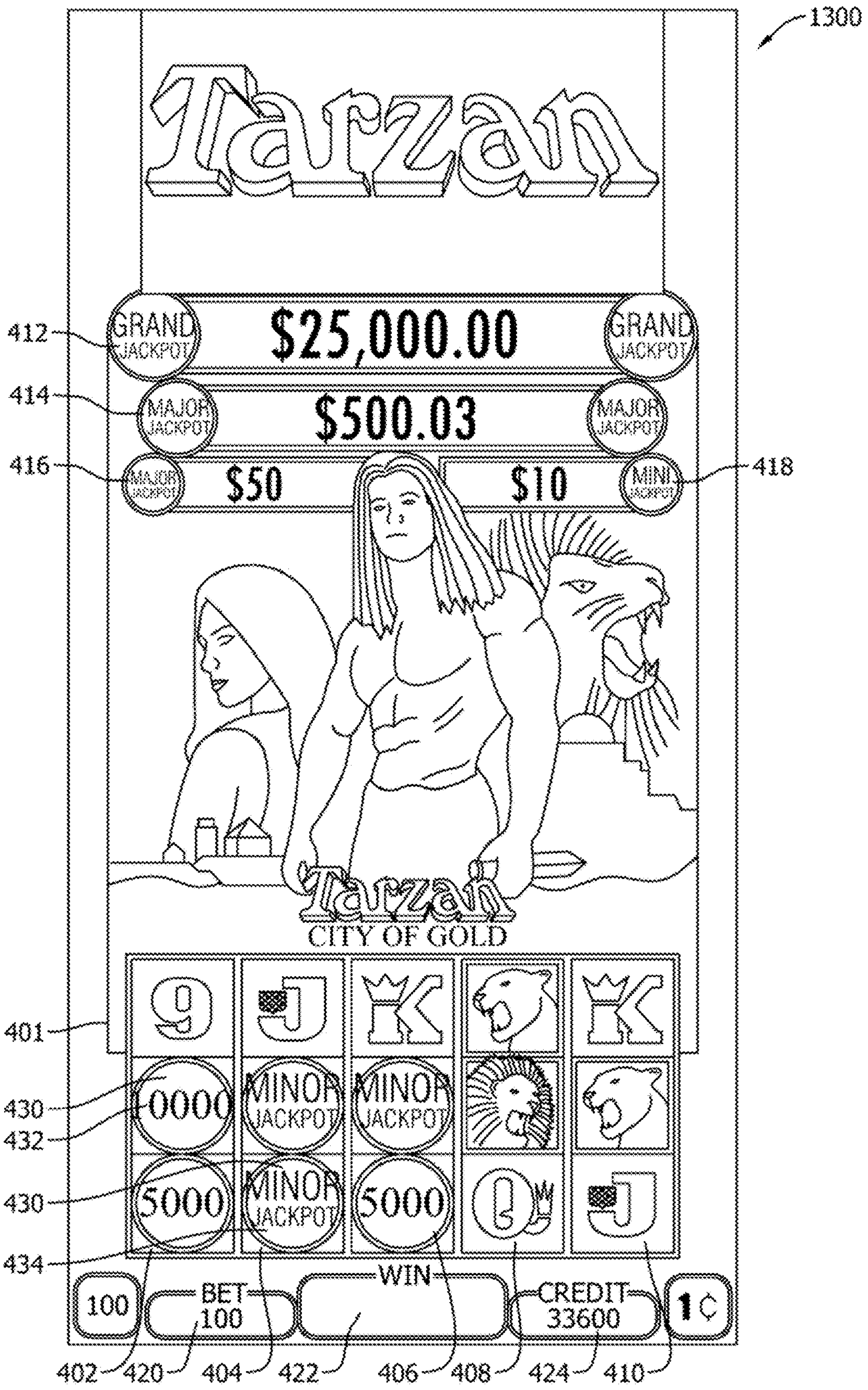
FIG. 13 is an example user interface or screenshot of the base game of the example electronic game.

FIG. 13 is an example user interface or screenshot 1300 of the base game of the exemplary electronic game in accordance with the present disclosure. In the example of FIG. 13, the base game outcome includes six of prize symbol 430, with three of prize symbol 430 including credit output 432 and three of prize symbol 430 including jackpot output 434. In the example of FIG. 13, the third game tier is applied, communicated to a user by the outline color of prize symbol 430, which appears as blue.

Figure 14:
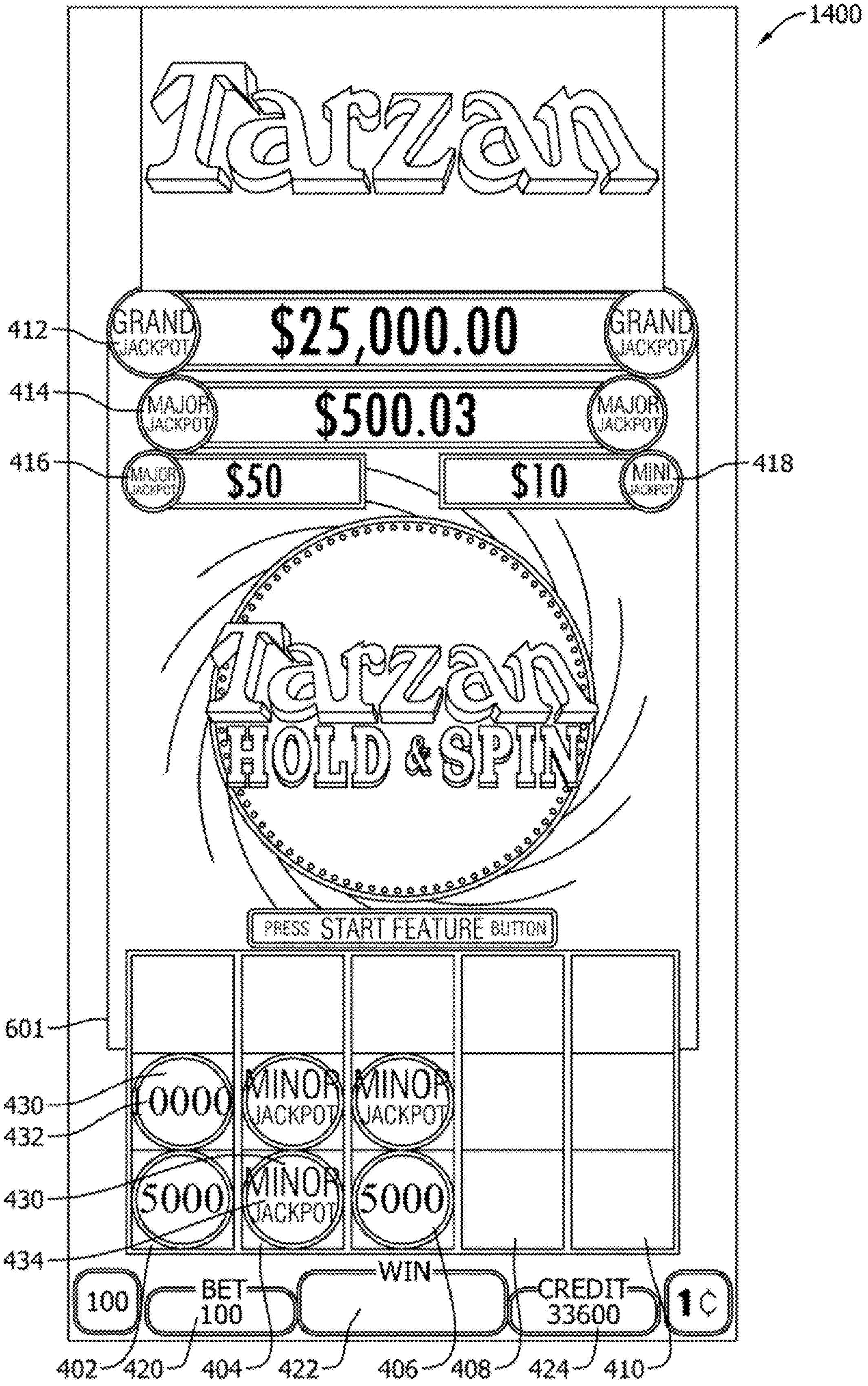
FIGS. 14-15 are example user interfaces or screenshots of the feature game of the example electronic game, continuing the base game example of FIG. 13.
Figure 15:
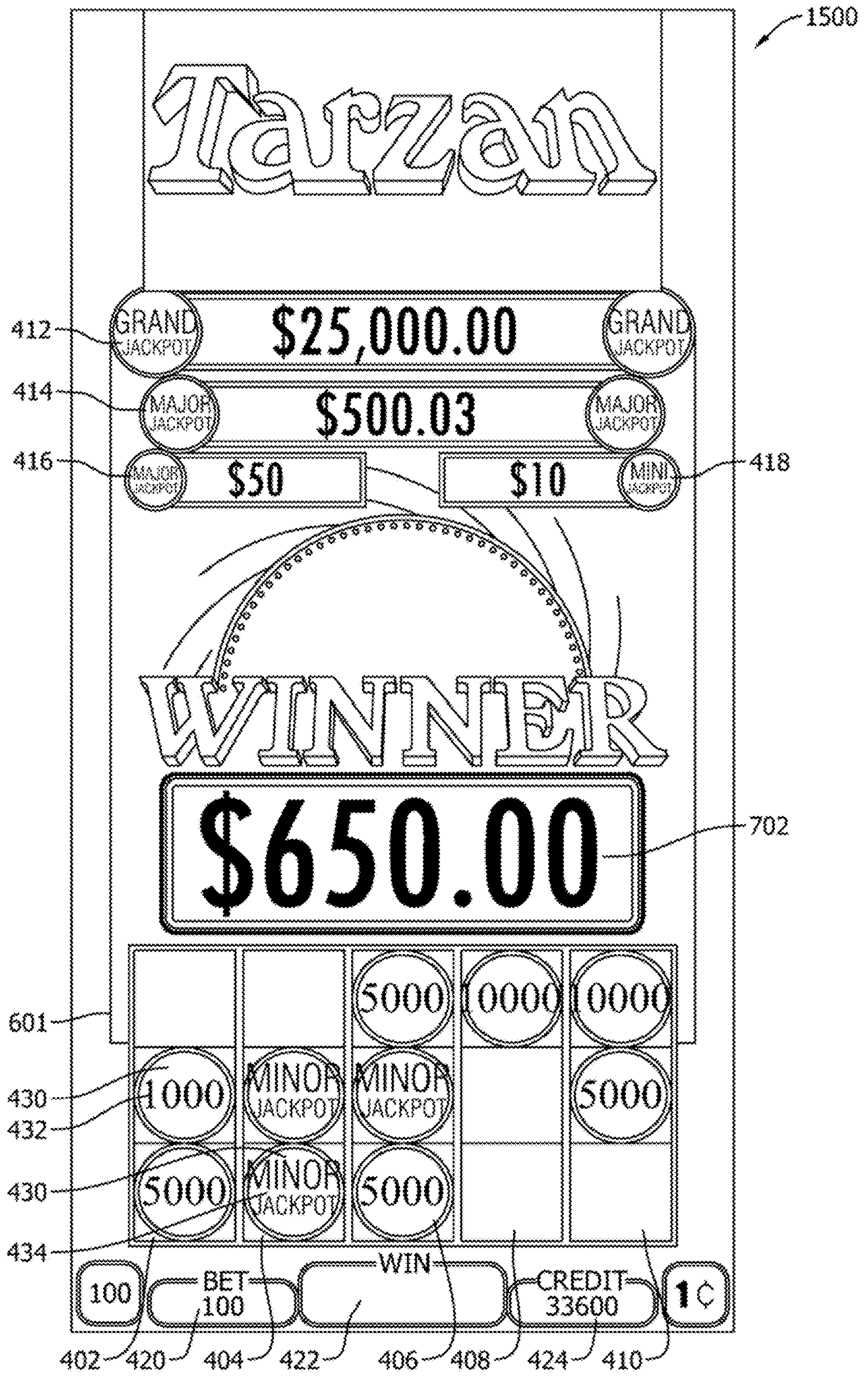

FIGS. 14-15 are example user interfaces or screenshots 1400-1500 of the feature game of the exemplary electronic game, continuing from the base game example of FIG. 13. In the example of FIG. 14, the multiple of prize symbol 430 that persisted from the base game (as shown in FIG. 13) are displayed to appear as full-color and the other symbols that did not persist from the base game to the feature game are displayed to appear as darkened/dimmed. In the example of FIG. 15, the symbols spun in their individual boxes/symbol display positions in the feature game for subsequent spins of reels 402-410 are displayed and the outputs of these symbols depend on the game tier of the base game (e.g., the third game tier for the examples of FIGS. 13-15).

Figure 16:
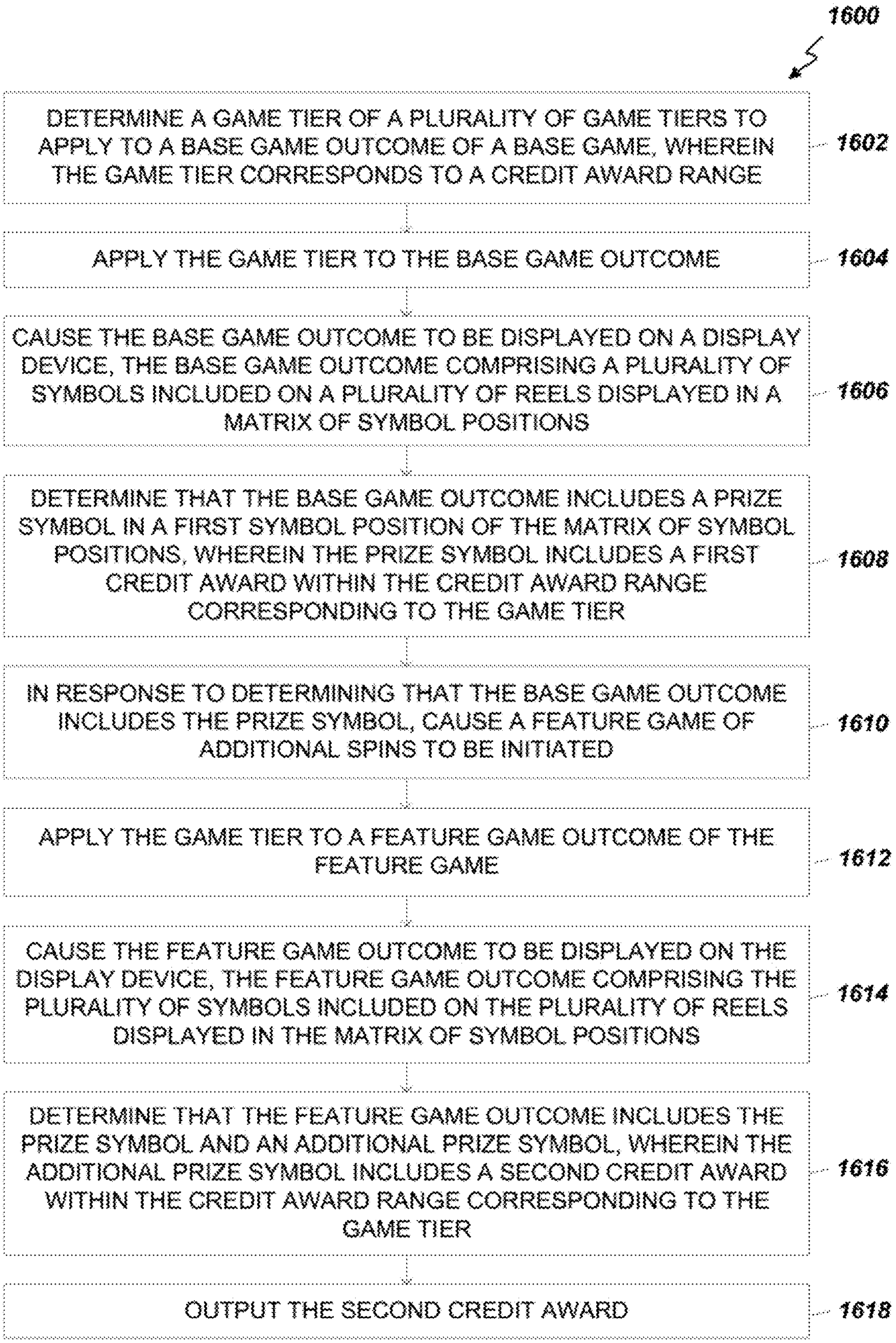
FIG. 16 is an exemplary method of electronic gaming in accordance with the present disclosure.

FIG. 16 illustrates an exemplary method 1600 of electronic gaming with persistent game tiers in accordance with the present disclosure. In some embodiments, method 1600 includes determining 1602 a game tier of a plurality of game tiers to apply to a base game outcome of a base game, wherein the game tier corresponds to a credit award range, applying 1604 the game tier to the base game outcome, and causing 1606 the base game outcome to be displayed on the display device, the base game outcome comprising a plurality of symbols included on a plurality of reels displayed in a matrix of symbol positions. Method 1600 also includes determining 1608 that the base game outcome includes a prize symbol in a first symbol position of the matrix of symbol positions, wherein the prize symbol includes a first credit award within the credit award range corresponding to the game tier, and, in response to determining that the base game outcome includes the prize symbol, causing 1610 a feature game of additional spins to be initiated. Method 1600 also includes applying 1612 the game tier to a feature game outcome of the feature game and causing 1614 the feature game outcome to be displayed on the display device, the feature game outcome comprising the plurality of symbols included on the plurality of reels displayed in the matrix of symbol positions. Method 1600 further includes determining 1616 that the feature game outcome includes the prize symbol and an additional prize symbol, wherein the additional prize symbol includes a second credit award within the credit award range corresponding to the game tier, and outputting 1618 the second credit award.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming device comprising:

a display device;

a memory device storing instructions; and a processor in communication with the display device and the memory device, wherein the instructions, when executed by the processor, cause the processor to:

determine a game tier of a plurality of game tiers to apply to a base game outcome of a base game, wherein the game tier corresponds to a credit award range;

apply the game tier to the base game outcome;

cause the base game outcome to be displayed on the display device, the base game outcome comprising a plurality of symbols included on a plurality of reels displayed in a matrix of symbol positions;

determine that the base game outcome includes a prize symbol in a first symbol position of the matrix of symbol positions, wherein the prize symbol includes a first credit award within the credit award range corresponding to the game tier;

in response to determining that the base game outcome includes the prize symbol, cause a feature game of additional spins to be initiated;

apply the game tier to a feature game outcome of the feature game;

cause the feature game outcome to be displayed on the display device, the feature game outcome comprising the plurality of symbols included on the plurality of reels displayed in the matrix of symbol positions;

determine that the feature game outcome includes the prize symbol and an additional prize symbol, wherein the additional prize symbol includes a second credit award within the credit award range corresponding to the game tier; and output the second credit award.

2. The electronic gaming device of claim 1, wherein the feature game outcome includes the prize symbol in the first symbol position of the matrix of symbol positions.

3. The electronic gaming device of claim 2, wherein each symbol position of the matrix of symbol positions of the feature game outcome comprises its own reel.

4. The electronic gaming device of claim 1, further comprising causing the processor to:

determine that the feature game outcome includes more than one additional prize symbol, wherein each of the additional prize symbol includes a credit award within the credit award range corresponding to the game tier; and output a sum of the credit award included on the more than one additional prize symbol.

5. The electronic gaming device of claim 4, wherein one of the more than one additional prize symbol includes a jackpot award associated with a set of one or more jackpot meters, the set of one or more jackpot meters corresponding to the game tier.

6. The electronic gaming device of claim 5, further comprising causing the processor to output a sum of the credit award included on the more than one additional prize symbol and the jackpot award included on one of the more than one additional prize symbol.

7. The electronic gaming device of claim 1, wherein the prize symbol includes a credit award that is a bet value increased by a multiplier, the multiplier being within a multiplier range corresponding to the game tier.

8. The electronic gaming device of claim 1, further comprising causing the processor to:

determine that the base game outcome includes a bonus symbol;

cause a bonus game of free spins to be initiated;

apply the game tier to a bonus game outcome of the bonus game;

cause the bonus game outcome to be displayed on the display device, the bonus game outcome comprising the plurality of symbols included on the plurality of reels displayed in the matrix of symbol positions;

determine that the bonus game outcome includes the prize symbol, wherein the prize symbol includes a credit award within the credit award range corresponding to the game tier; and output the credit award.

9. The electronic gaming device of claim 1, further comprising causing the processor to:

determine a second game tier of a plurality of game tiers to apply to a subsequent base game outcome;

apply the second game tier to the subsequent base game outcome;

cause the subsequent base game outcome to be displayed on the display device; and determine that the subsequent base game outcome includes the prize symbol, wherein the prize symbol includes a credit award within the credit award range corresponding to the second game tier.

10. The electronic gaming device of claim 9, further comprising causing the processor to:

in response to determining that the subsequent base game outcome includes the prize symbol, cause the feature game to be initiated;

apply the second game tier to a subsequent feature game outcome of the feature game;

cause the subsequent feature game outcome to be displayed on the display device;

determine that the subsequent feature game outcome includes the prize symbol, wherein the prize symbol includes another credit award within the credit award range corresponding to the second game tier; and output the other credit award.

11. The electronic gaming device of claim 10, wherein the credit award range corresponding to the second game tier is a subset of the credit award range corresponding to a first game tier, the subset being associated with a top portion of the credit award range.

12. A method of electronic gaming, the method comprising:

determining a game tier of a plurality of game tiers to apply to a base game outcome of a base game, wherein the game tier corresponds to a credit award range;

applying the game tier to the base game outcome;

causing the base game outcome to be displayed on a display device, the base game outcome comprising a plurality of symbols included on a plurality of reels displayed in a matrix of symbol positions;

determining that the base game outcome includes a prize symbol in a first symbol position of the matrix of symbol positions, wherein the prize symbol includes a first credit award within the credit award range corresponding to the game tier;

in response to determining that the base game outcome includes the prize symbol, causing a feature game of additional spins to be initiated;

applying the game tier to a feature game outcome of the feature game;

causing the feature game outcome to be displayed on the display device, the feature game outcome comprising the plurality of symbols included on the plurality of reels displayed in the matrix of symbol positions;

determining that the feature game outcome includes the prize symbol and an additional prize symbol, wherein the additional prize symbol includes a second credit award within the credit award range corresponding to the game tier; and outputting the second credit award.

13. The method of claim 12, further comprising:

determining that the feature game outcome includes more than one additional prize symbol, wherein each of the additional prize symbol includes a credit award within the credit award range corresponding to the game tier; and outputting a sum of the credit award included on the more than one additional prize symbol.

14. The method of claim 12, further comprising:

determining that the base game outcome includes a bonus symbol;

causing a bonus game of free spins to be initiated;

applying the game tier to a bonus game outcome of the bonus game;

causing the bonus game outcome to be displayed on the display device, the bonus game outcome comprising the plurality of symbols included on the plurality of reels displayed in the matrix of symbol positions;

determining that the bonus game outcome includes the prize symbol, wherein the prize symbol includes a credit award within the credit award range corresponding to the game tier; and outputting the credit award.

15. The method of claim 12, further comprising:

determining a second game tier of a plurality of game tiers to apply to a subsequent base game outcome;

applying the second game tier to the subsequent base game outcome;

causing the subsequent base game outcome to be displayed on the display device; and determining that the subsequent base game outcome includes the prize symbol, wherein the prize symbol includes a credit award within the credit award range corresponding to the second game tier.

16. The method of claim 15, further comprising:

in response to determining that the subsequent base game outcome includes the prize symbol, causing the feature game to be initiated;

applying the second game tier to a subsequent feature game outcome of the feature game;

causing the subsequent feature game outcome to be displayed on the display device;

determining that the subsequent feature game outcome includes the prize symbol, wherein the prize symbol includes another credit award within the credit award range corresponding to the second game tier; and outputting the other credit award.

17. A non-transitory computer-readable storage medium with instructions stored thereon that, in response to execution by at least one processor, cause the at least one processor to:

determine a game tier of a plurality of game tiers to apply to a base game outcome of a base game, wherein the game tier corresponds to a credit award range;

apply the game tier to the base game outcome;

cause the base game outcome to be displayed on a display device, the base game outcome comprising a plurality of symbols included on a plurality of reels displayed in a matrix of symbol positions;

determine that the base game outcome includes a prize symbol in a first symbol position of the matrix of symbol positions, wherein the prize symbol includes a first credit award within the credit award range corresponding to the game tier;

in response to determining that the base game outcome includes the prize symbol, cause a feature game of additional spins to be initiated;

apply the game tier to a feature game outcome of the feature game;

cause the feature game outcome to be displayed on the display device, the feature game outcome comprising the plurality of symbols included on the plurality of reels displayed in the matrix of symbol positions;

determine that the feature game outcome includes the prize symbol and an additional prize symbol, wherein the additional prize symbol includes a second credit award within the credit award range corresponding to the game tier; and output the second credit award.

18. A non-transitory computer-readable storage medium of claim 17, further comprising causing the processor to:

determine that the feature game outcome includes more than one additional prize symbol, wherein each of the additional prize symbol includes a credit award within the credit award range corresponding to the game tier; and output a sum of the credit award included on the more than one additional prize symbol.

19. A non-transitory computer-readable storage medium of claim 17, further comprising causing the processor to:

determine that the base game outcome includes a bonus symbol;

cause a bonus game of free spins to be initiated;

apply the game tier to a bonus game outcome of the bonus game;

cause the bonus game outcome to be displayed on the display device, the bonus game outcome comprising the plurality of symbols included on the plurality of reels displayed in the matrix of symbol positions;

determine that the bonus game outcome includes the prize symbol, wherein the prize symbol includes a credit award within the credit award range corresponding to the game tier; and output the credit award.

20. A non-transitory computer-readable storage medium of claim 17, further comprising causing the processor to:

determine a second game tier of a plurality of game tiers to apply to a subsequent base game outcome;

apply the second game tier to the subsequent base game outcome;

cause the subsequent base game outcome to be displayed on the display device; and determine that the subsequent base game outcome includes the prize symbol, wherein the prize symbol includes a credit award within the credit award range corresponding to the second game tier.

* * * * *